(12) United States Patent
Kondo et al.

(10) Patent No.: US 8,620,109 B2
(45) Date of Patent: Dec. 31, 2013

(54) IMAGE PROCESSING APPARATUS, IMAGE PROCESSING METHOD AND IMAGE PROCESSING PROGRAM

(75) Inventors: Yuhi Kondo, Tokyo (JP); Takefumi Nagumo, Kanagawa (JP); Jun Luo, Tokyo (JP)

(73) Assignee: Sony Corporation, Tokyo (JP)

( * ) Notice: Subject to any disclaimer, the term of this patent is extended or adjusted under 35 U.S.C. 154(b) by 357 days.

(21) Appl. No.: 13/100,195

(22) Filed: May 3, 2011

(65) Prior Publication Data
US 2011/0274370 A1    Nov. 10, 2011

(30) Foreign Application Priority Data

May 10, 2010   (JP) ................................ P2010-108407

(51) Int. Cl.
*G06K 9/32*   (2006.01)

(52) U.S. Cl.
USPC ........................................................ 382/299

(58) Field of Classification Search
USPC ............. 345/3.3, 698; 348/208.13, 668;
348/E11.013; 358/3.07; 375/E7.031, E7.1,
375/E7.252; 382/299; 700/239
See application file for complete search history.

(56) References Cited

U.S. PATENT DOCUMENTS

| 2003/0080981 A1* | 5/2003 | Lin et al. .................... 345/660 |
| 2009/0207288 A1* | 8/2009 | Tanaka et al. ............... 348/294 |
| 2009/0245375 A1* | 10/2009 | Liu ......................... 375/240.16 |

FOREIGN PATENT DOCUMENTS

| JP | 2008-140012 | 6/2008 |
| JP | 2008-294601 | 12/2008 |

* cited by examiner

*Primary Examiner* — Gregory F Cunningham
(74) *Attorney, Agent, or Firm* — Finnegan, Henderson, Farabow, Garrett & Dunner, L.L.P.

(57) ABSTRACT

Disclosed herein is an image processing apparatus including an up-sampling section configured to carry out up-sampling processing in order to generate an up-sampled image, a motion-compensated image generation section configured to generate a motion-compensated image as a result of correction processing to adjust a referenced image having the second resolution to a photographing-object position on the up-sampled image by making use of information on a difference between the up-sampled image and the referenced image, a blending processing section configured to generate a blended image as a result of blending processing to blend the up-sampled image with the referenced image, and an output-image generation section configured to receive and process the blended image as well as the up-sampled image in order to generate an output blended image obtained by blending a super-resolution processing-result image with a noise-reduction processing-result image.

18 Claims, 12 Drawing Sheets

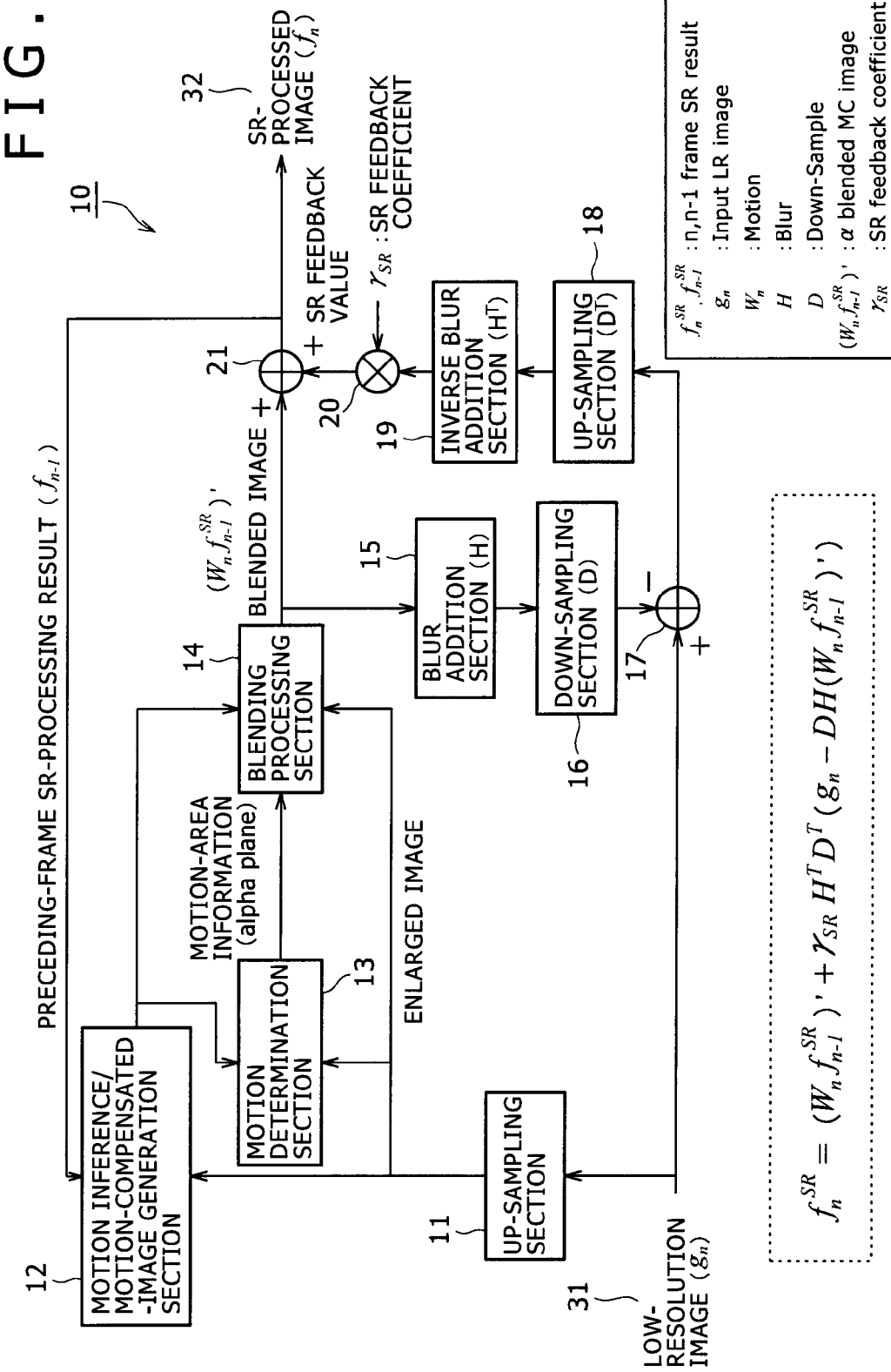

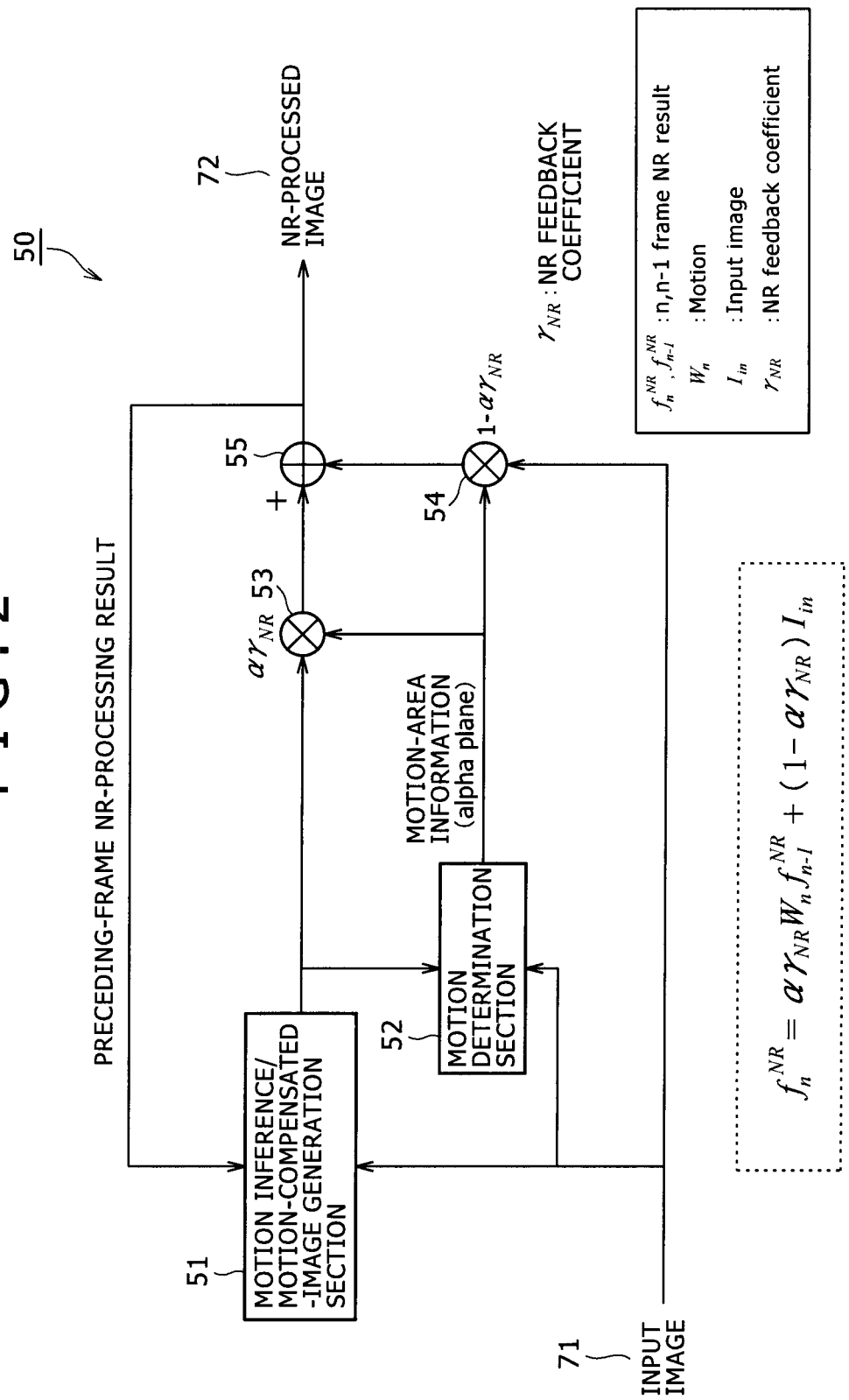

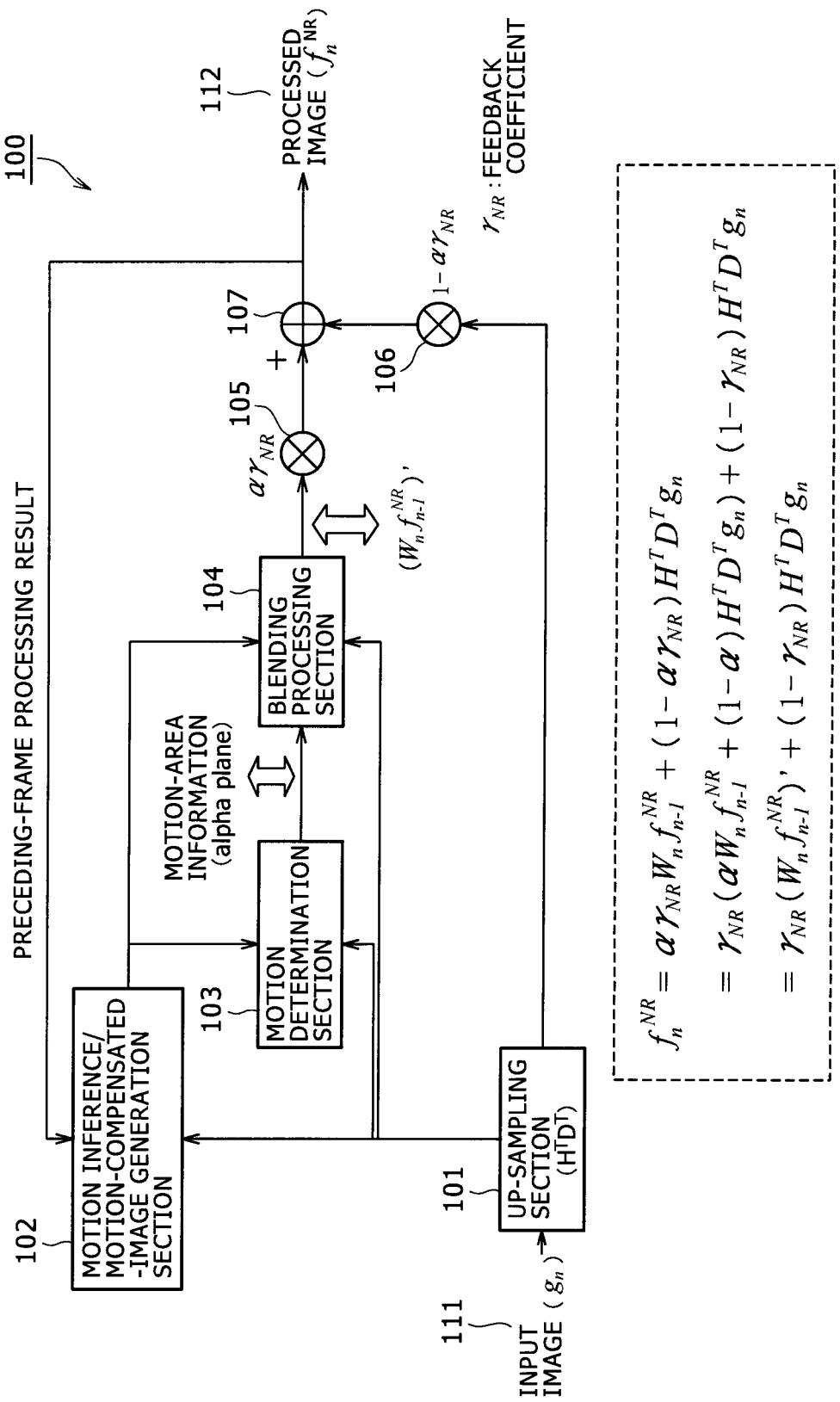

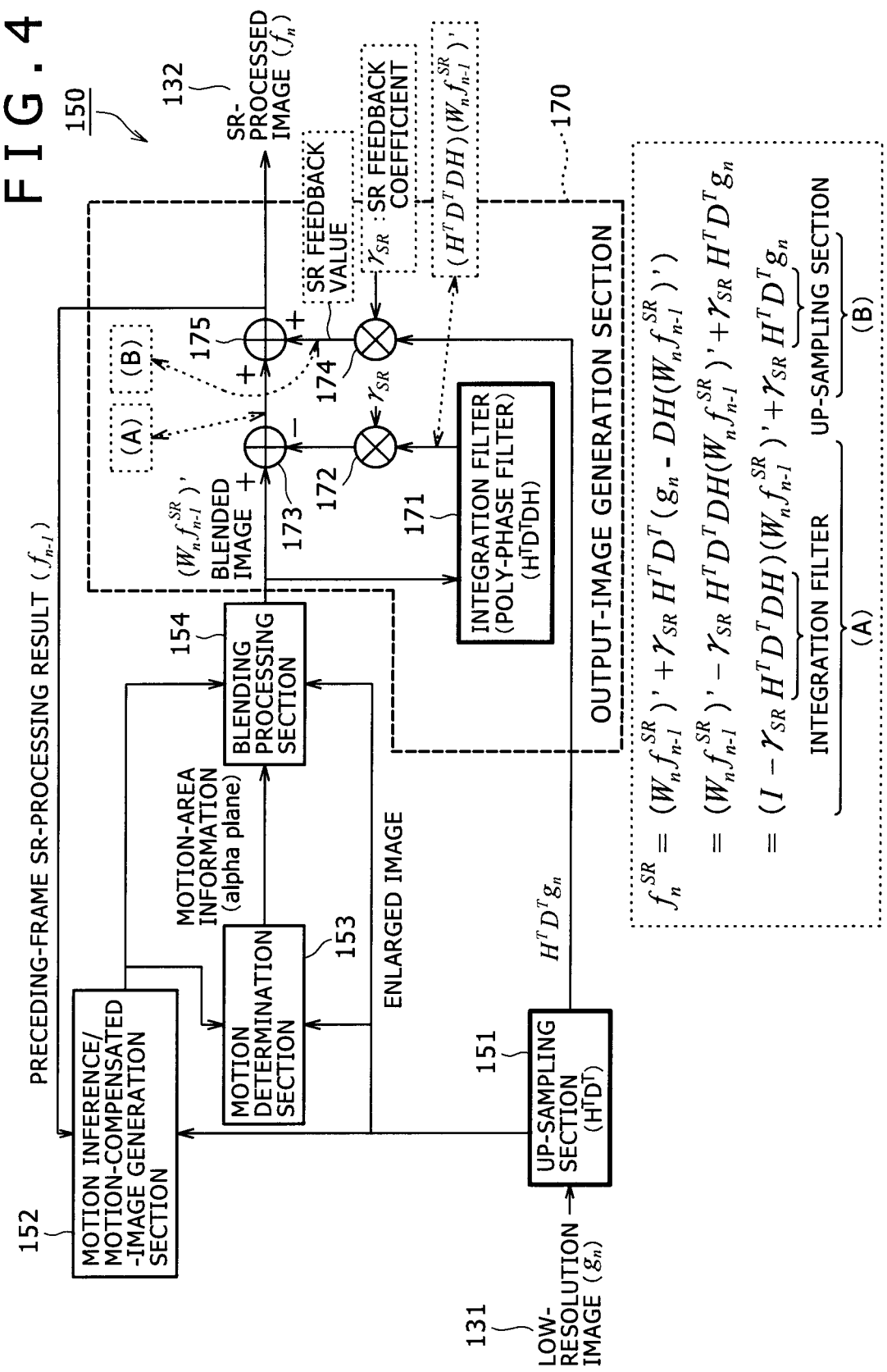

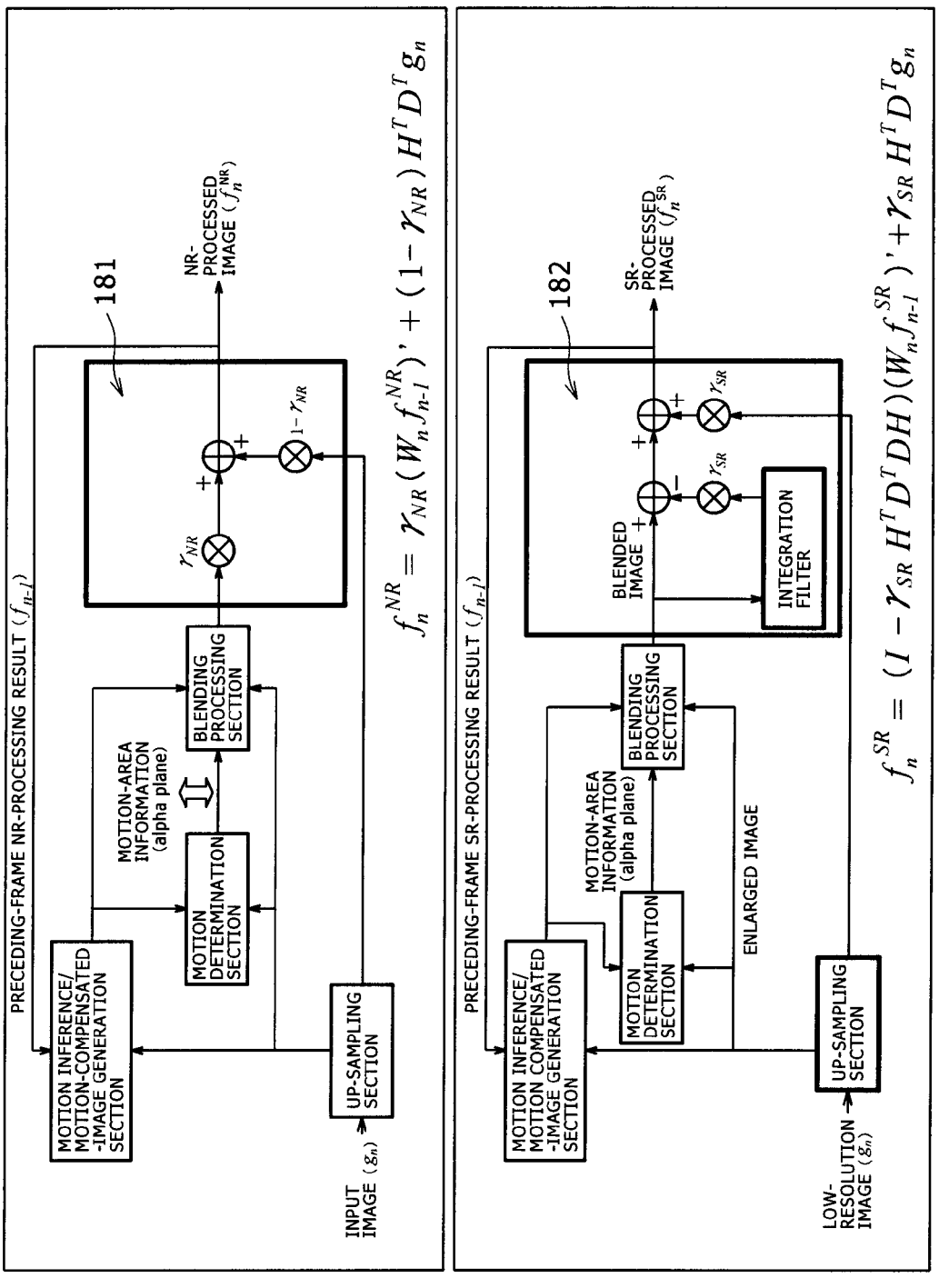

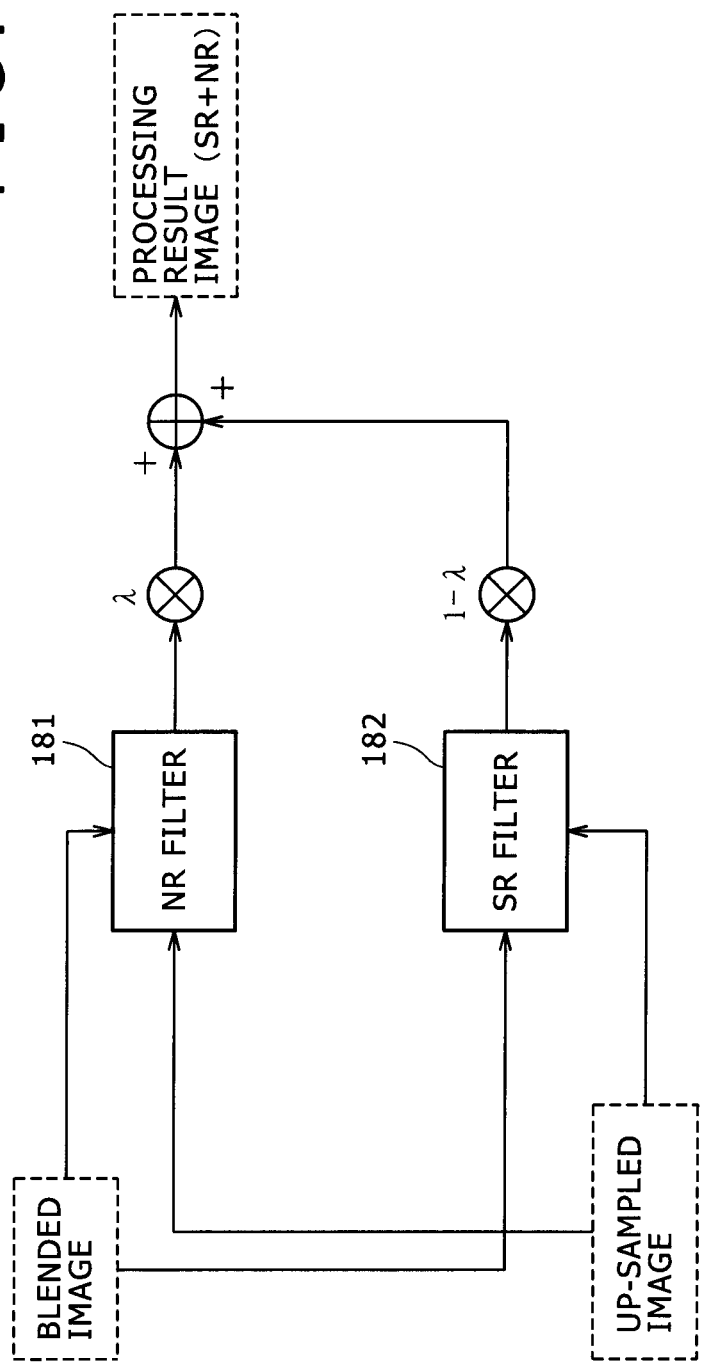

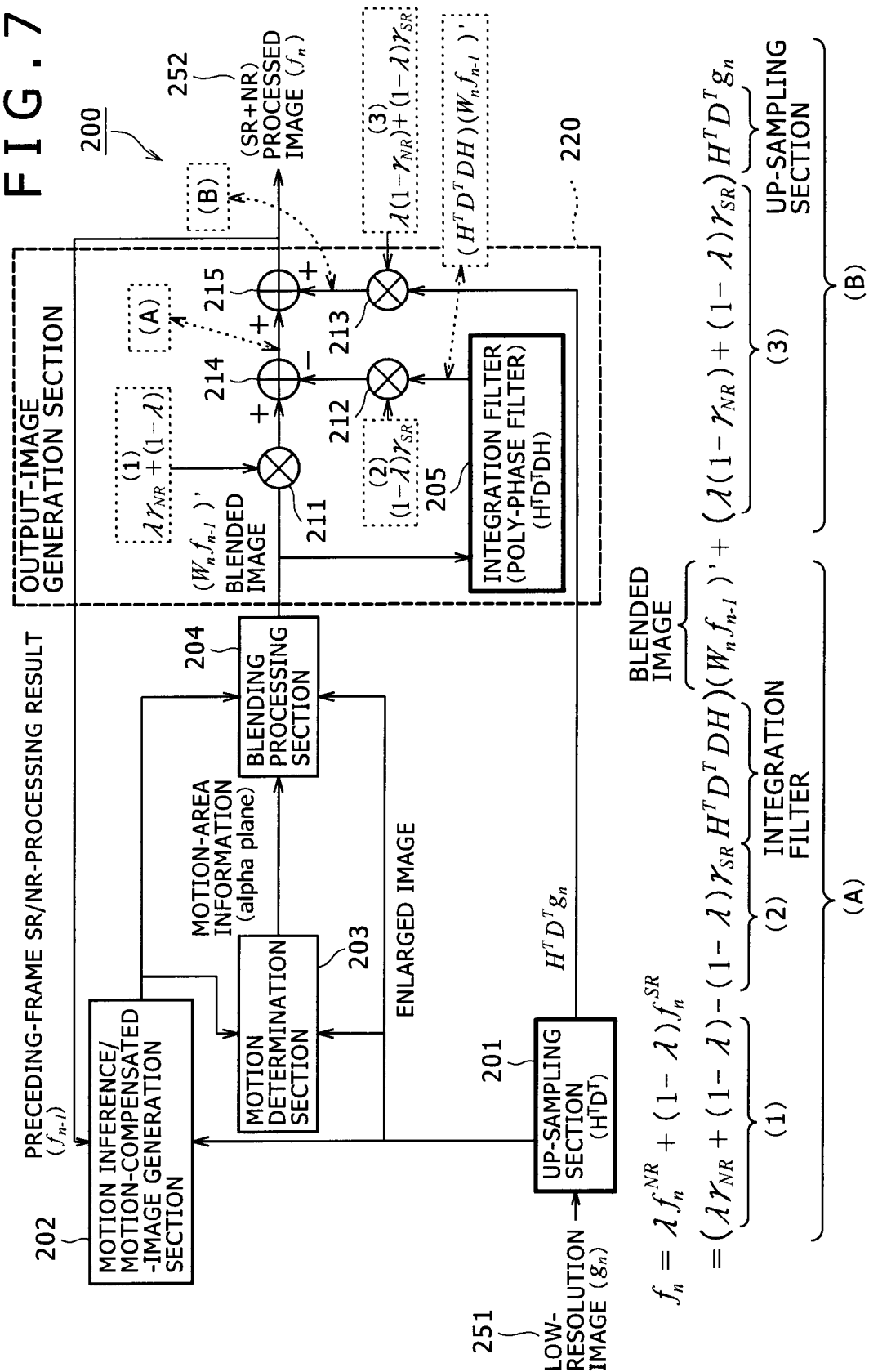

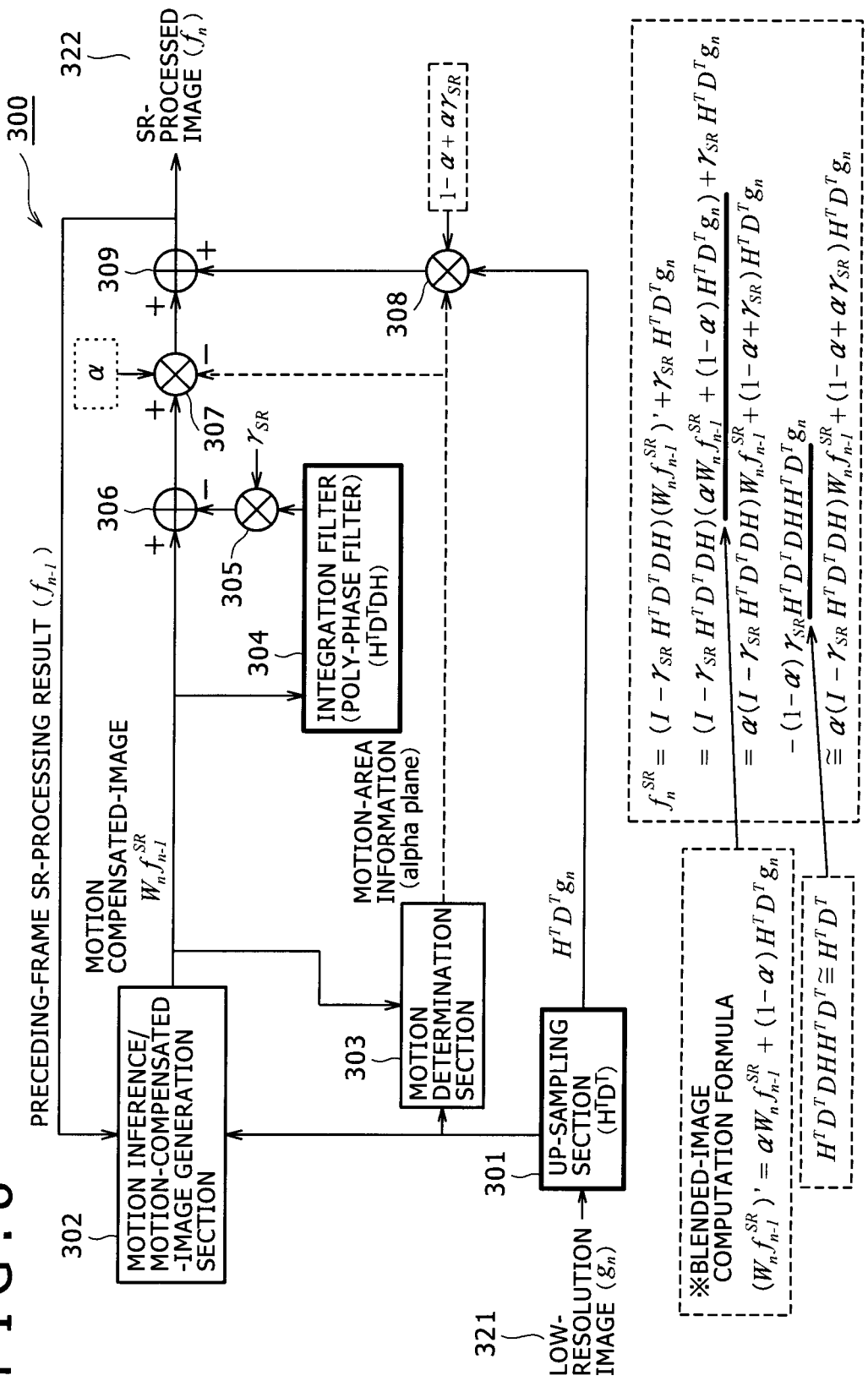

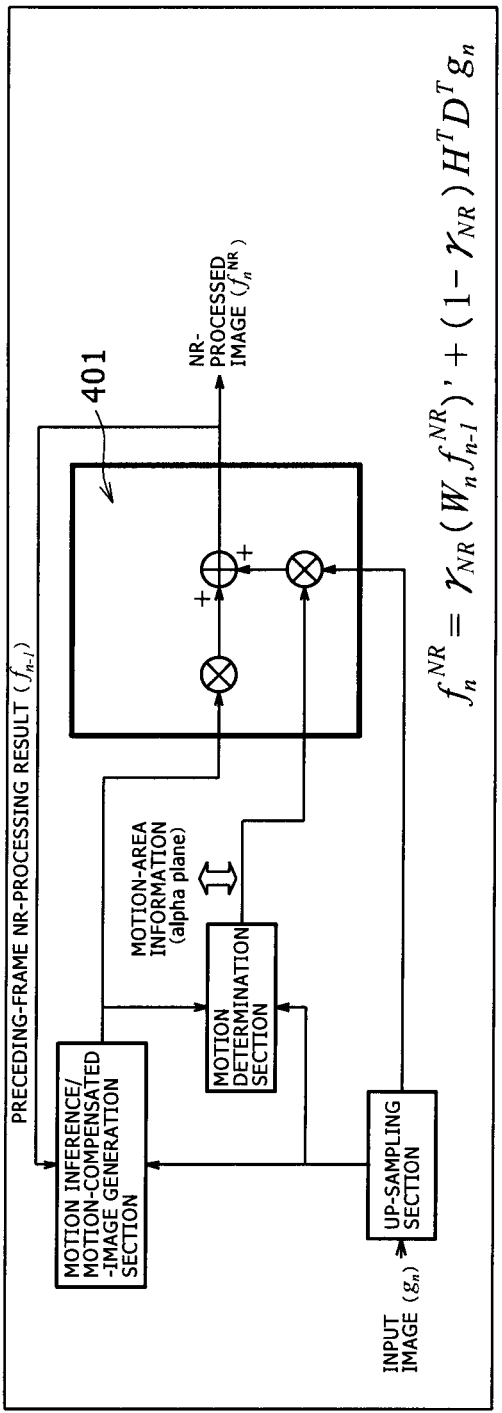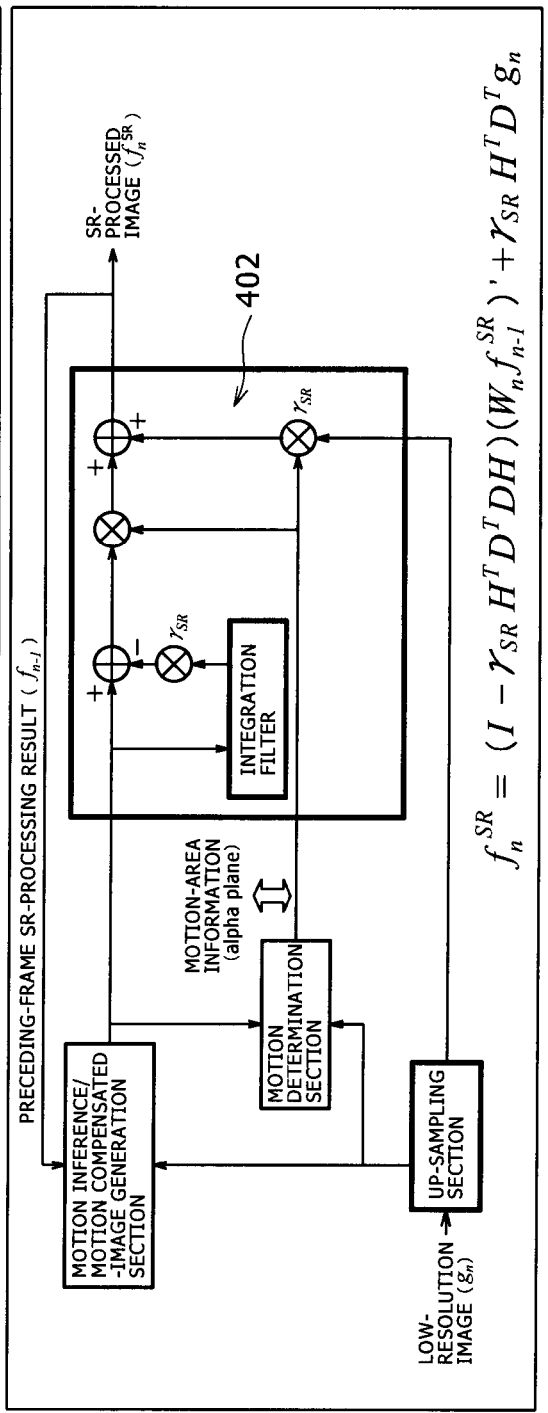
FIG. 9A
FIG. 9B

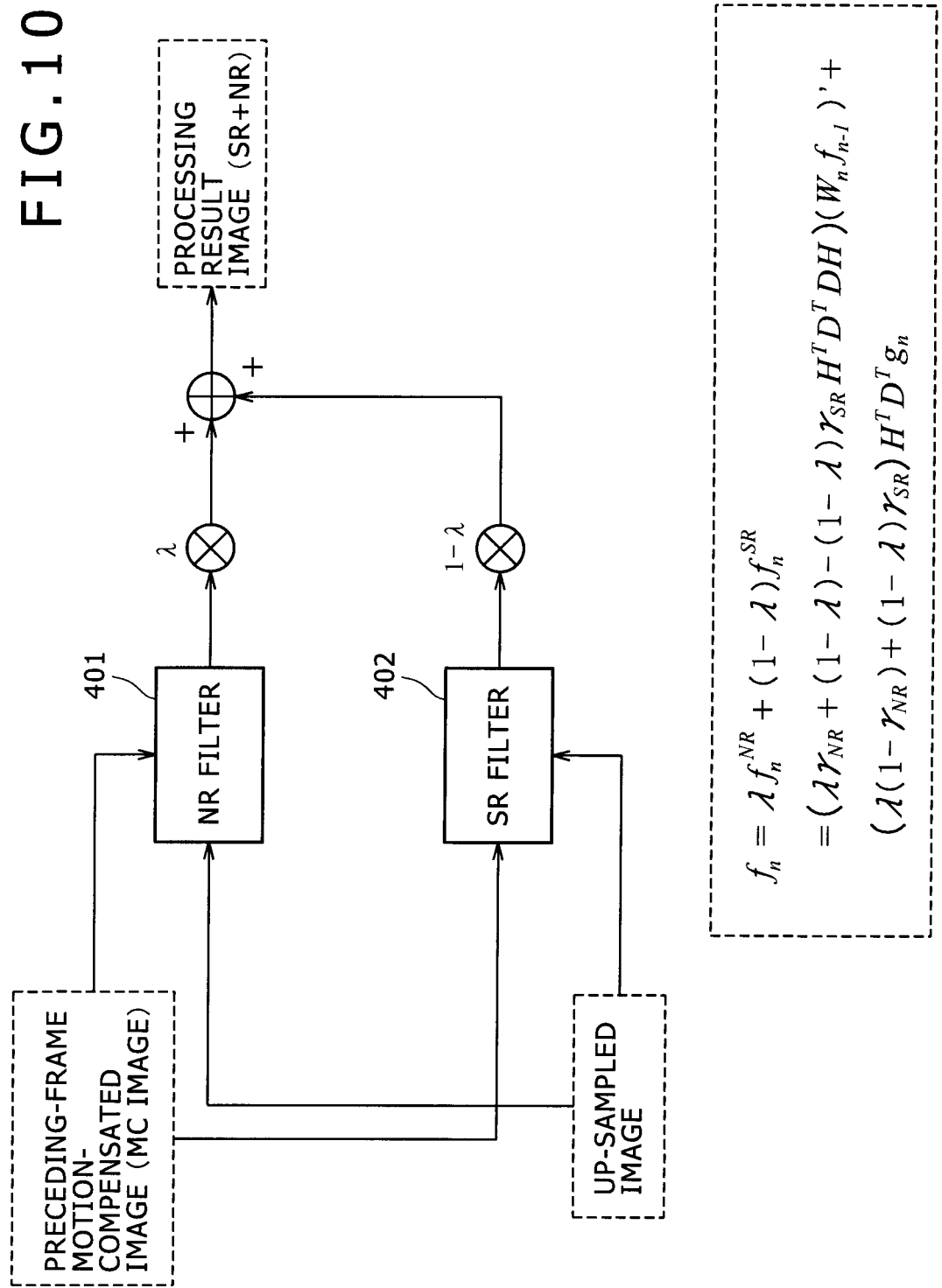

IMAGE PROCESSING APPARATUS, IMAGE PROCESSING METHOD AND IMAGE PROCESSING PROGRAM

BACKGROUND OF THE INVENTION

1. Field of the Invention

The present invention relates to an image processing apparatus, an image processing method and an image processing program. More particularly, the present invention relates to an image processing apparatus for carrying out NR (noise reduction) processing in addition to execution of SR (super-resolution) processing on an image in order to raise the resolution of the image, relates to an image processing method to be adopted by the apparatus and relates to an image processing program implementing the method.

2. Description of the Related Art

As a technique for generating an image with a high resolution from an image with a low resolution, there is known a technique for carrying out SR processing which is processing for generating an image with a high resolution from an image with a low resolution.

As a technique for carrying out the SR processing, for example, there is known a reconfiguration-type super-resolution technique for inferring an ideal image with a high resolution on the basis of a photographing image of an image with a low resolution by making use of parameters derived as parameters showing photographing conditions such as "blurring caused by lens and atmosphere scatterings," "motions of the photographing object and the entire camera" and "sampling by the imaging device."

An existing technology disclosed as a technology underlying a technique for carrying out the super-resolution processing is described in documents such as Patent Document 1 which is Japanese Patent Laid-open No. 2008-140012.

An outline of the procedure of the reconfiguration-type super-resolution technique is described as follows:

(1) An image photographing model considering photographing conditions such as blurs, motions and samplings is expressed by a mathematical formula.

(2) A cost computation formula is found from the image photographing model expressed by the mathematical formula. In the process to find the cost formula, a regularization term such as an advance confirmation term may also be added by adoption of the Bayesian theory in some cases.

(3) An image minimizing the cost is found.

A technique for finding an image having a high resolution is implemented by carrying out these kinds of processing. Even though the high-resolution image obtained as a result of the reconfiguration-type super-resolution technique is dependent on the input image, the super-resolution effect (or the resolution restoration effect) is big.

FIG. 1 is a block diagram showing a typical configuration of an SR processing circuit for carrying out the super-resolution processing. That is to say, FIG. 1 is a block diagram showing a typical configuration of a super-resolution processing apparatus 10.

The super-resolution processing apparatus 10 carries out processing described as follows. An up-sampling section 11 receives a low-resolution input image ($g_n$) 31 to be subjected to processing to raise the resolution of the image. The up-sampling section 11 carries out up-sampling processing which is a resolution conversion process to raise the resolution of the low-resolution input image ($g_n$) 31. That is to say, the up-sampling section 11 carries out processing to adjust the resolution of the low-resolution input image ($g_n$) 31 to the resolution of an SR (super resolution)-processed image ($f_n$) 32 which is a high-resolution image to be eventually generated. For example, the up-sampling section 11 carries out enlargement processing to divide every pixel of the low-resolution input image ($g_n$) 31 into a plurality of pixels of the SR-processed image ($f_n$) 32. In the following description, the SR-processed image is also referred to as an SR (super resolution) processing result image.

A motion-inference/motion-compensated-image generation section 12 detects the magnitude of a motion from a high-resolution image ($f_{n-1}$) generated in the processing carried out on an immediately preceding frame to a high-resolution up-sampled image obtained as a result of the up-sampling processing carried out by the up-sampling section 11 on the low-resolution input image ($g_n$) 31. To put it concretely, the motion-inference/motion-compensated-image generation section 12 computes a motion vector between the high-resolution image ($f_{n-1}$) and the high-resolution up-sampled image. Then, by making use of the computed motion vector, the motion-inference/motion-compensated-image generation section 12 carries out MC (motion compensation) processing on the high-resolution image ($f_{n-1}$). To put it in detail, the motion-inference/motion-compensated-image generation section 12 carries out the MC processing on the high-resolution image ($f_{n-1}$) in order to generate a motion compensation result image setting the photographing object at the same position as the photographing object in the high-resolution up-sampled image obtained as a result of the up-sampling processing carried out by the up-sampling section 11 on the low-resolution input image ($g_n$) 31. In the following descriptions, the motion compensation result image is also referred to as a motion-compensated image.

A motion determination section 13 compares the motion-compensated high-resolution image obtained as a result of the MC processing with a high-resolution up-sampled image obtained as a result of the up-sampling processing carried out by the up-sampling section 11 on the low-resolution input image ($g_n$) 31 in order to detect an area to which the MC processing may not be applied well. When the photographing object itself is moving for example, an unsuccessful motion-compensation area is generated.

The motion determination section 13 generates motion area information referred to as an α map [0:1] for distinguishing a successful motion-compensation area from an unsuccessful motion-compensation area. A successful motion-compensation area is an area in which a motion compensation result image generated by the motion-inference/motion-compensated-image generation section 12 on the basis of the high-resolution image $f_{n-1}$ of the immediately preceding frame sets the photographing object at the same position as the photographing object in the high-resolution up-sampled image obtained as a result of the up-sampling processing carried out by the up-sampling section 11 on the low-resolution input image ($g_n$) 31. On the other hand, an unsuccessful motion-compensation area is an area in which the motion compensation result image generated on the basis of the high-resolution image $f_{n-1}$ of the immediately preceding frame does not set the photographing object at the same position as the photographing object in the high-resolution up-sampled image obtained as a result of the up-sampling processing carried out by the up-sampling section 11 on the low-resolution input image ($g_n$) 31. The motion area information referred to as an α map [0:1] is a map having a value varying in the range 1 to 0 in accordance with the degree of confidence for the successful motion-compensation area and the unsuccessful motion-compensation area. In a simple application for example, the value of the α map [0:1] for an area is set at 1 in order to indicate that the area is a successful motion-compensation area or set at 0 in order to indicate that the area is an unsuccessful motion-compensation area.

A blending processing section 14 receives a motion compensation result image generated by the motion-inference/motion-compensated-image generation section 12 on the basis of the high-resolution image $f_{n-1}$ of the immediately preceding frame, a high-resolution up-sampled image obtained as a result of the up-sampling processing carried out by the up-sampling section 11 on a low-resolution input image ($g_n$) 31 and the motion area information referred to as an α map [0:1] generated by the motion determination section 13.

The blending processing section 14 makes use of the received inputs described above to output a blended image obtained as a result of blending processing carried out on the basis of an equation given as follows:

Blended image=(1−α)(high-resolution up-sampled image)+α(motion compensation result image)

In the above equation, reference symbol a denotes the aforementioned α map [0:1] having a value in the range 0 to 1. The value of the α map [0:1] is a blending coefficient α of the motion compensation result image. The blending coefficient α is used as a weight assigned to the motion compensation result image in the blending processing. By carrying out the blending processing, it is possible to generate a blended image by making use of an increased blending coefficient α as a weight assigned to the motion compensation result image for a successful motion-compensation area but a decreased blending coefficient α as a weight assigned to the motion compensation result image for an unsuccessful motion-compensation area.

In the following description, a blending ratio is defined as the ratio α/(1−α) in order to distinguish the blending ratio from the blending coefficient α.

A blur addition section 15 receives the blended image generated by the blending processing section 14 and carries out simulation processing for the blended image to simulate deteriorations of the spatial resolution. For example, the blur addition section 15 carries out convolution to the image by taking a PSF (point spread function) measured in advance as a filter.

A down-sampling section 16 carries out down-sampling processing to lower the resolution of the high-resolution image to the same resolution as the low-resolution input image ($g_n$) 31. Then, a subtractor 17 computes a difference between an image output by the down-sampling section 16 and the low-resolution input image ($g_n$) 31 for every pixel. The difference is subsequently subjected to up-sampling processing carried out by an up-sampling section 18. Then, an inverse blur addition section 19 carries out processing inverse to blur addition processing. The operation of the inverse blur addition processing is the same as processing to compute a correlation with the PSF (point spread function) used in the blur addition section 15.

A multiplier 20 carries out an operation to multiply the image output by the inverse blur addition section 19 by an SR feedback coefficient $\gamma_{SR}$ set in advance in order to generate a product and supplies the product to an adder 21. Then, the adder 21 carries out an operation to add the product to the blended image generated by the blending processing section 14 in order to generate the output image of the super-resolution processing apparatus 10.

The image generated by the adder 21 as the output of the super-resolution processing apparatus 10 is an SR (super resolution) processing-result image ($f_n$) 32 which is an image obtained as a result of raising the resolution of the low-resolution input image ($g_n$) 31.

The processing carried out by the super-resolution processing apparatus 10 shown in FIG. 1 can be expressed by the following equation:

$$f_n^{SR} = (W_n f_{n-1}^{SR})' + \gamma_{SR} H^T D^T (g_n - DH(W_n f_{n-1}^{SR})') \quad (1)$$

It is to be noted that a variety of reference symbols used in Eq. (1) given above denote parameters described as follows.
n: Frame number. For example, frames (n−1) and n are consecutive frames of a moving image.
$g_n$: Input image (a low-resolution image of frame n)
$f_n^{SR}$: Super-resolution image of frame n (an image obtained as a result of super-resolution processing for frame n)
$f_{n-1}^{SR}$: Super-resolution image of frame n−1 (an image obtained as a result of super-resolution processing for frame n−1)
$W_n$: Information on a frame motion from frame (n−1) to frame n. This information is expressed by typically a motion vector or a matrix.
H: Blur addition processing (expressed by a blur filter matrix)
D: Down-sampling processing (expressed by a down-sampling processing matrix)
$(W_n f_{n-1}^{SR})'$: Blended image output by the blending processing section
$\gamma_{SR}$: SR feedback coefficient
$H^T$: Transposed matrix of matrix H
$D^T$: Transposed matrix of matrix D In accordance with a super resolution technique adopted by the super-resolution processing apparatus 10 shown in FIG. 1, the following processing is carried out effectively.
(a) On the basis of a folding-back component of an input image, high-frequency components are inferred. In the following description, the folding-back component is also referred to as an aliasing. The high-frequency components are components each having a frequency at least equal to the Nyquist frequency.
(b) Folding-back components within low-frequency components are eliminated in order to restore high-frequency components. The low-frequency components are components each having a frequency not exceeding the Nyquist frequency.

If a magnifying power specified to generate a super-resolution image does not match the magnifying power of an alias component caused by a resolution set from the beginning prior to contraction of the image, however, there is raised a problem that an alias is left in the image as before. In addition, an alias component not corrected because the image has been determined to be the image of a moving body is also left inevitably in the image as noises. As a result, there is raised a problem that noises caused by an alias component are undesirably left.

SUMMARY OF THE INVENTION

It is thus a desire of the present invention addressing the problems like the ones described above to provide an image processing apparatus also capable of reducing noises during super-resolution processing, an image processing method to be adopted by the apparatus and an image processing program implementing the method.

According to an embodiment of the present invention, there is provided an image processing apparatus including:
an up-sampling section for carrying out up-sampling processing to increase the number of pixels composing an input image having a first resolution to the number of pixels composing an image having a second resolution higher than the first resolution in order to generate an up-sampled image;

a motion-compensated image generation section for generating a motion-compensated image as a result of correction processing to adjust a referenced image having the second resolution to a photographing-object position on the up-sampled image by making use of information on a difference between the up-sampled image and the referenced image;

a blending processing section for generating an intermediate blended image as a result of blending processing to blend the up-sampled image with the referenced image by comparing the up-sampled image with the motion-compensated image for every image area unit and by setting a blending coefficient of the referenced image at a such a value that, the higher the degree of pixel-value matching for an image area unit, the higher the value at which the blending coefficient is set for the image area unit; and an output-image generation section for receiving and processing the intermediate blended image as well as the up-sampled image in order to generate an output blended image obtained by blending a super-resolution processing-result image obtained as a result of super-resolution processing carried out as processing to increase the resolution of the input image with a noise-reduction processing-result image obtained as a result of noise reduction processing carried out to reduce noises of the input image.

According to another embodiment of the present invention, there is provided an image processing apparatus including:

an up-sampling section for carrying out up-sampling processing to increase the number of pixels composing an input image having a first resolution to the number of pixels composing an image having a second resolution higher than the first resolution in order to generate an up-sampled image;

a motion-compensated image generation section for generating a motion-compensated image as a result of correction processing to adjust a referenced image having the second resolution to a photographing-object position on the up-sampled image by making use of information on a difference between the up-sampled image and the referenced image; and an output-image generation section for receiving and processing the motion-compensated image as well as the up-sampled image in order to generate an output blended image obtained by blending a super-resolution processing-result image obtained as a result of super-resolution processing carried out as processing to increase the resolution of the input image with a noise-reduction processing-result image obtained as a result of noise reduction processing carried out to reduce noises of the input image.

According to further embodiment of the present invention, there is provided an image processing method to be adopted by an image processing apparatus employing an up-sampling section, a motion-compensated image generation section, a blending processing section and an output-image generation section, the image processing method including:

an up-sampling processing step of driving the up-sampling section to carry out up-sampling processing to increase the number of pixels composing an input image having a first resolution to the number of pixels composing an image having a second resolution higher than the first resolution in order to generate an up-sampled image;

a motion-compensated image generation step of driving the motion-compensated image generation section to generate a motion-compensated image as a result of correction processing to adjust a referenced image having the second resolution to a photographing-object position on the up-sampled image by making use of information on a difference between the up-sampled image and the referenced image;

a blending processing step of driving the blending processing section to generate an intermediate blended image as a result of blending processing to blend the up-sampled image with the referenced image by comparing the up-sampled image with the motion-compensated image for every image area unit and by setting a blending coefficient of the referenced image at a such a value that, the higher the degree of pixel-value matching for an image area unit, the higher the value at which the blending coefficient is set for the image area unit; and an output-image generation step of driving the output-image generation section to receive and process the intermediate blended image as well as the up-sampled image in order to generate an output blended image obtained by blending a super-resolution processing-result image obtained as a result of super-resolution processing carried out as processing to increase the resolution of the input image with a noise-reduction processing-result image obtained as a result of noise reduction processing carried out to reduce noises of the input image.

According to still further embodiment of the present invention, there is provided an image processing method to be adopted by an image processing apparatus employing an up-sampling section, a motion-compensated image generation section and an output-image generation section, the image processing method including:

an up-sampling processing step of driving the up-sampling section to carry out up-sampling processing to increase the number of pixels composing an input image having a first resolution to the number of pixels composing an image having a second resolution higher than the first resolution in order to generate an up-sampled image;

a motion-compensated image generation step of driving the motion-compensated image generation section to generate a motion-compensated image as a result of correction processing to adjust a referenced image having the second resolution to a photographing-object position on the up-sampled image by making use of information on a difference between the up-sampled image and the referenced image; and an output-image generation step of driving the output-image generation section to receive and process the motion-compensated image as well as the up-sampled image in order to generate an output blended image obtained by blending a super-resolution processing-result image obtained as a result of super-resolution processing carried out as processing to increase the resolution of the input image with a noise-reduction processing-result image obtained as a result of noise reduction processing carried out to reduce noises of the input image.

According to further embodiment of the present invention, there is provided an image processing program to be executed by an image processing apparatus, which employs an up-sampling section, a motion-compensated image generation section, a blending processing section and an output-image generation section, in order to carry out:

an up-sampling processing step of driving the up-sampling section to carry out up-sampling processing to increase the number of pixels composing an input image having a first resolution to the number of pixels composing an image having a second resolution higher than the first resolution in order to generate an up-sampled image;

a motion-compensated image generation step of driving the motion-compensated image generation section to generate a motion-compensated image as a result of correction processing to adjust a referenced image having the second resolution to a photographing-object position on the up-sampled image by making use of information on a difference between the up-sampled image and the referenced image;

a blending processing step of driving the blending processing section to generate an intermediate blended image as a result of blending processing to blend the up-sampled image with the referenced image by comparing the up-sampled image with the motion-compensated image for every image area unit and by setting a blending coefficient of the referenced image at a such a value that, the higher the degree of pixel-value matching for an image area unit, the higher the value at which the blending coefficient is set for the image area unit; and an output-image generation step of driving the output-image generation section to receive and process the intermediate blended image as well as the up-sampled image in order to generate an output blended image obtained by blending a super-resolution processing-result image obtained as a result of super-resolution processing carried out as processing to increase the resolution of the input image with a noise-reduction processing-result image obtained as a result of noise reduction processing carried out to reduce noises of the input image.

According to further embodiment of the present invention, there is provided an image processing program to be executed by an image processing apparatus, which employs an up-sampling section, a motion-compensated image generation section and an output-image generation section, in order to carry out:

an up-sampling processing step of driving the up-sampling section to carry out up-sampling processing to increase the number of pixels composing an input image having a first resolution to the number of pixels composing an image having a second resolution higher than the first resolution in order to generate an up-sampled image;

a motion-compensated image generation step of driving the motion-compensated image generation section to generate a motion-compensated image as a result of correction processing to adjust a referenced image having the second resolution to a photographing-object position on the up-sampled image by making use of information on a difference between the up-sampled image and the referenced image; and an output-image generation step of driving the output-image generation section to receive and process the motion-compensated image as well as the up-sampled image in order to generate an output blended image obtained by blending a super-resolution processing-result image obtained as a result of super-resolution processing carried out as processing to increase the resolution of the input image with a noise-reduction processing-result image obtained as a result of noise reduction processing carried out to reduce noises of the input image.

It is to be noted that each of the image processing programs according to an embodiment of the present invention is a program that can be presented to the image processing apparatus or a computer system functioning as the image processing apparatus by making use of a recoding medium or a communication medium in a program-code form that can be read by the image processing apparatus or the computer system. That is to say, the image processing apparatus or the computer system is capable of reading and executing the codes of the image processing programs. Thus, by executing the image processing programs, the image processing apparatus or the computer system is capable of carrying out processing prescribed by the steps described above as steps of the image processing programs.

Each other feature of the present invention as well as each characteristic and each merit which are exhibited by the present invention will probably become obvious from later detailed explanation of embodiments of the present invention with reference to diagrams. It is to be noted that the technical term 'system' used in this specification of the present invention is by no means limited to an apparatus provided with any one of a variety of configurations and enclosed in a cabinet. That is to say, the technical term 'system' may also imply the configuration of a logical confluence including a plurality of apparatus.

In accordance with the configurations of embodiments of the present invention, it is possible to implement image processing apparatus for carrying out also noise reduction processing in addition to super-resolution processing and implement image processing methods to be adopted by the apparatus. That is to say, in each of the configurations, the image processing apparatus receives an input image having a low resolution and carries out the super-resolution processing in order to increase the resolution of the image to a high resolution as well as the noise reduction processing. To put it concretely, first of all, the image processing apparatus typically carries out up-sampling processing to increase the number of pixels composing the input image having a low resolution referred to as a first resolution to the number of pixels composing an image having a second resolution which is a high resolution higher than the low resolution in order to generate an up-sampled image. Then, the image processing apparatus generates a motion-compensated image as a result of correction processing to adjust the photographing object on a referenced image having the second resolution to a photographing-object position on the up-sampled image by making use of information on a difference between the up-sampled image and the referenced image. Finally, the image processing apparatus carries out typically an integration filtering process and a calculation process on internally generated images including the up-sampled image and the motion-compensated image or the up-sampled image and a blended image obtained as a result of blending the referenced image and the up-sampled image. The image processing apparatus carries out the integration filtering process and the calculation process in order to generate an eventual output image equivalent to an image obtained by performing the super-resolution processing and the noise reduction processing on the input image.

BRIEF DESCRIPTION OF THE DRAWINGS

FIG. 1 is an explanatory block diagram showing a typical configuration of an existing circuit for carrying out super-resolution processing;

FIG. 2 is an explanatory block diagram showing a typical configuration of a circuit for carrying out noise reduction processing;

FIG. 3 is an explanatory block diagram showing a typical configuration of a noise reduction processing circuit obtained by modifying the configuration of the circuit shown in FIG. 2;

FIG. 4 is an explanatory block diagram showing a typical configuration of a super-resolution processing circuit obtained by modifying the configuration of the circuit shown in FIG. 1;

FIGS. 5A and 5B are upper and lower explanatory block diagrams showing the circuits shown in FIGS. 3 and 4 respectively;

FIG. 6 is an explanatory block diagram to be referred to in description of how to configure an image processing apparatus by combining the circuits shown in FIGS. 3 and 4;

FIG. 7 is an explanatory block diagram showing a typical configuration of a first embodiment implementing an image processing apparatus obtained by combining the circuits shown in FIGS. 3 and 4 to serve as an apparatus for carrying out the noise reduction processing and the super-resolution processing;

FIG. 8 is an explanatory block diagram showing a typical configuration of a super-resolution processing circuit obtained by further modifying the configuration of the circuit shown in FIG. 4;

FIGS. 9A and 9B are upper and lower explanatory block diagrams showing the circuits shown in FIGS. 2 and 8 respectively;

FIG. 10 is an explanatory block diagram to be referred to in description of how to configure an image processing apparatus by combining the circuits shown in FIGS. 2 and 8;

DETAILED DESCRIPTION OF THE PREFERRED EMBODIMENTS

Figure 11:
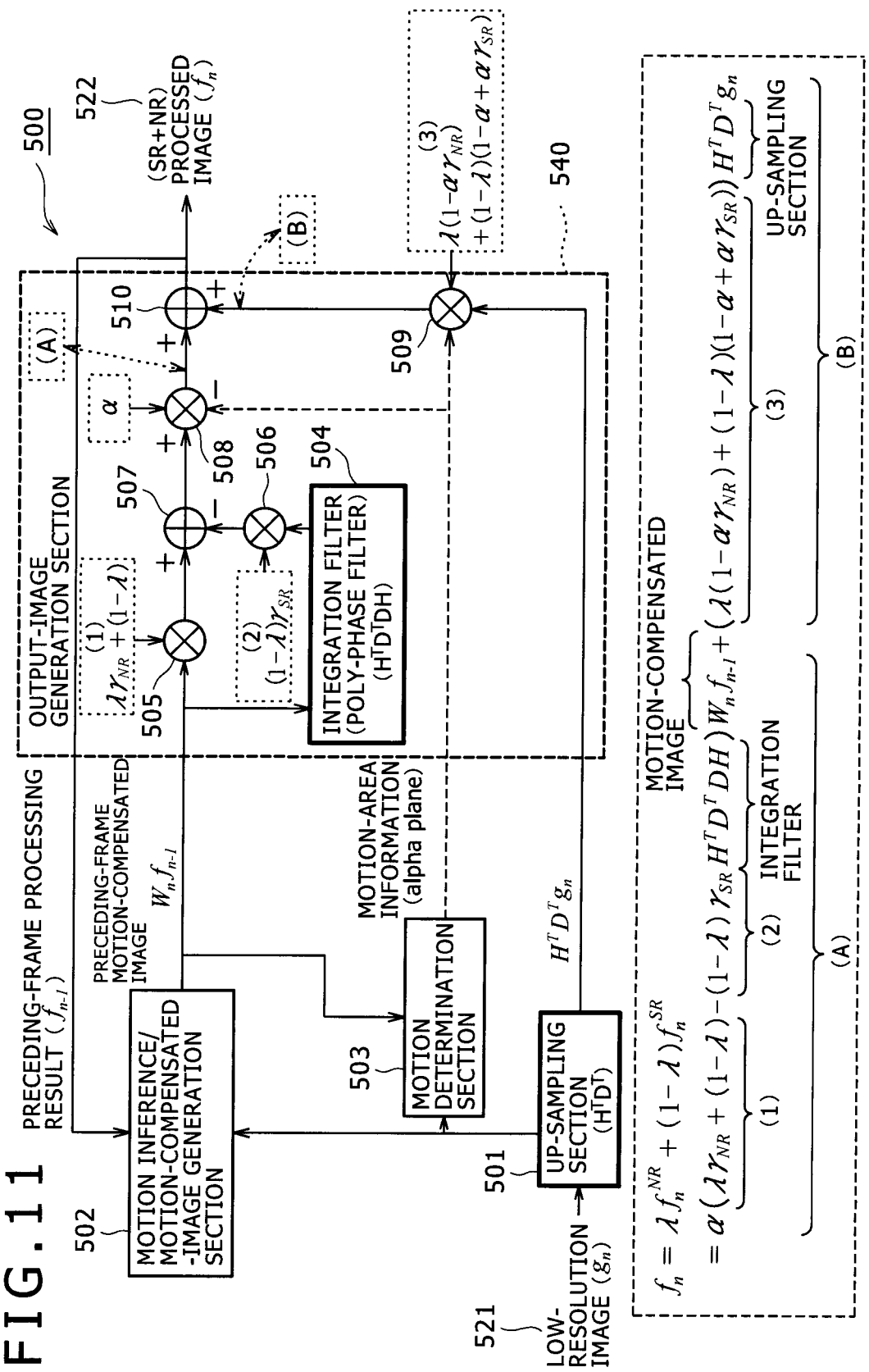
FIG. 11 is an explanatory block diagram showing a typical configuration of a second embodiment implementing an image processing apparatus obtained by combining the circuits shown in FIGS. 2 and 8 to serve as an apparatus for carrying out the noise reduction processing and the super-resolution processing.

By referring to the diagrams, the following description explains details of an image processing apparatus, an image processing method and an image processing program which are provided by the present invention. It is to be noted that the following description explains the image processing apparatus, the image processing method and the image processing program in chapters arranged as follows.
1: Image Processing Apparatus for Carrying Out Super-Resolution Processing and Noise Reduction Processing
1-1: First Embodiment Combining a Noise Reduction Processing Circuit (NR Circuit) with a Super-resolution Processing Circuit (SR Circuit) by Using the SR Circuit as a Base Configuration
1-2: Second Embodiment Combining a Noise Reduction Processing Circuit (NR Circuit) with a Super-resolution Processing Circuit (SR Circuit) by Using the NR Circuit as a Base Configuration
2: Setting a Blending Ratio λ for a Noise Reduction Processing-Result Image and a Super-Resolution Processing-Result Image
3: Typical Hardware Configuration of the Image Processing Apparatus
1: Image Processing Apparatus for Carrying Out Super-Resolution Processing and Noise Reduction Processing The following description explains a typical configuration of an image processing apparatus provided by the present invention to serve as an apparatus for carrying out super-resolution processing and noise reduction processing.

It is to be noted that a basic super-resolution processing circuit referred to as an SR circuit is described in Patent Document 1. On the other hand, a noise reduction processing circuit referred to as an NR circuit is described in documents such as Japanese Patent Laid-open No. 2008-294601. It is also worth noting that both Patent Document 1 and Japanese Patent Laid-open No. 2008-294601 have been written by the same inventors as the present invention.

This chapter explains the following embodiments sequentially one after another:
(a): A first embodiment combining a noise reduction processing circuit (also referred to as an NR circuit) with a super-resolution processing circuit (also referred to as an SR circuit) by making use of the SR circuit as a base configuration
(b): A second embodiment combining a noise reduction processing circuit (an NR circuit) with a super-resolution processing circuit (an SR circuit) by making use of the NR circuit as a base configuration Each of the first and second embodiments carries out super-resolution processing and noise reduction processing.
1-1: First Embodiment Combining a Noise Reduction Processing Circuit (NR Circuit) with a Super-Resolution Processing Circuit (SR Circuit) by Using the SR Circuit as a Base Configuration First of all, the description begins with explanation of a first embodiment combining a noise reduction processing circuit (NR circuit) with a super-resolution processing circuit (SR circuit) by making use of the SR circuit as a base configuration. The super-resolution processing circuit (SR circuit) is described in Patent Document 1.

The super-resolution processing circuit also referred to as an SR circuit has been described by referring to FIG. 1. On the other hand, the noise reduction processing circuit also referred to as an NR circuit is described in documents such as Japanese Patent Laid-open No. 2008-294601. The configuration of the noise reduction processing circuit (NR circuit) 50 whose front-stage circuit is used in the configuration of the second embodiment is explained by referring to FIG. 2 as follows.

The noise reduction processing circuit 50 shown in FIG. 2 receives an input image 71 to be subjected to noise reduction processing. The input image 71 is supplied to a motion-inference/motion-compensated-image generation section 51 and a motion determination section 52.

The motion-inference/motion-compensated-image generation section 51 detects the magnitude of a motion from a reduced-noise image $f^{NR}_{n-1}$ obtained as a result of processing carried out on an immediately preceding frame to the input image $f_n$. To put it concretely, the motion-inference/motion-compensated-image generation section 51 computes a motion vector between the reduced-noise image $f^{NR}_{n-1}$ and the input image $f_n$. Then, by making use of the computed motion vector, the motion-inference/motion-compensated-image generation section 51 carries out MC (motion compensation) processing on the reduced-noise image $f^{NR}_{n-1}$ of the immediately preceding frame. To put it in detail, the motion-inference/motion-compensated-image generation section 51 carries out the MC processing on the reduced-noise image $f^{NR}_{n-1}$ in order to generate a motion compensation result image setting the photographing object at the same position as the photographing object in the input image $f_n$. In an unsuccessful motion-compensation area such as an area where the photographing object is moving, however, the position of the photographing object in the motion compensation result image is shifted from the position of the photographing object in the input image $f_n$.

The motion determination section 52 compares the motion-compensated image obtained as a result of the MC (motion compensation) processing with the input image in order to detect the unsuccessful motion-compensation area defined as an area to which the MC processing may not be well applied. For example, the unsuccessful motion-compensation area is generated on an image portion in which the photographing object itself is moving as described earlier.

The motion determination section 52 compares pixel values of the motion-compensated image generated by the motion-inference/motion-compensated-image generation section 51 by taking the reduced-noise image $f^{NR}_{n-1}$ of the immediately preceding frame as the base with pixel values at the same pixel positions in the input image $f_n$ in order to determine the sameness of the position of the photographing object on the basis of the result of the comparison. That is to say, an image area is determined to be a successful motion-compensation area if, in the image area, the photographing object has been determined to have been set at the same pixel positions in the motion-compensated image as those in the input image. On the other hand, an image area is determined to be an unsuccessful motion-compensation area if, in the image area, the photographing object has been determined to have not been set at the same pixel positions in the motion-compensated image as those in the input image. The motion determination section 52 generates a map for distinguishing the successful motion-compensation area from the unsuccessful motion-compensation area. That is to say, the motion determination section 52 generates motion area information referred to as an α map [0:1] for distinguishing the successful motion-compensation area from the unsuccessful motion-compensation area.

The motion area information referred to as an α map [0:1] is a map having a value varying in the range 1 to 0 in accordance with the degree of confidence for the successful motion-compensation area and the unsuccessful motion-compensation area. In a simple application for example, the value of the α map [0:1] for an area is set at 1 in order to indicate that the area is a successful motion-compensation area with the highest degree of confidence or set at 0 in order to indicate that the area is an unsuccessful motion-compensation area with the highest degree of confidence.

A multiplier 53 carries out an operation to multiply the motion-compensated image generated by the motion-inference/motion-compensated-image generation section 51 by taking the reduced-noise image $f^{NR}_{n-1}$ of the immediately preceding frame as the base by a product $\alpha\gamma_{NR}$ obtained as a result of multiplying the value α of the motion area information referred to as an α map generated by the motion determination section 52 by $\gamma_{NR}$. It is to be noted that the value α of the motion area information is referred to as a blending coefficient α whereas reference symbol $\gamma_{NR}$ used in the term expressing the product $\alpha\gamma_{NR}$ denotes an NR feedback coefficient determined in advance.

On the other hand, a multiplier 54 carries out an operation to multiply the input image 71 by $(1-\alpha\gamma_{NR})$ where reference symbol a denotes the blending coefficient which is the value of the motion area information referred to as an α map generated by the motion determination section 52 whereas reference symbol $\gamma_{NR}$ denotes the NR feedback coefficient mentioned above.

An adder 55 carries out an operation to add the image output by the multiplier 53 to the image output by the multiplier 54 in order to generate an NR processing result image 72 as a reduced-noise image. That is to say, the adder 55 carries out blending processing based on an equation given below on the images output by the multiplier 53 and the multiplier 54 in order to generate a blended image as the NR processing result image 72.

NR processing result image=$(1-\alpha\gamma_{NR})$(input image)+ $\alpha\gamma_{NR}$(motion compensation result image)

This blending processing is processing carried out by making use of an increased blending coefficient $\alpha\gamma_{NR}$ as a weight assigned to the motion compensation result image for a successful motion-compensation area or by making use of a decreased blending coefficient $\alpha\gamma_{NR}$ as a weight assigned to the motion compensation result image for an unsuccessful motion-compensation area. By carrying out the blending processing, the adder 55 is capable of generating the NR processing result image 72 as a reduced-noise image.

The processing carried out by the noise reduction processing circuit 50 shown in FIG. 2 can be expressed by Eq. (2) given as follows.

$$f_n^{NR}=\alpha\gamma_{NR}W_n f_{n-1}^{NR}+(1-\alpha\gamma_{NR})I_{in} \quad (2)$$

It is to be noted that a variety of reference symbols used in Eq. (2) given above denote parameters described as follows.
n: Frame number. For example, frames (n−1) and n are consecutive frames of a moving image.
$I_{in}$: Input image (a low-resolution image of frame n)
$f_n^{NR}$: Reduced-noise image of frame n (an image obtained as a result of noise reduction processing for frame n)
$f_{n-1}^{NR}$: Reduced-noise image of frame n−1
$W_n$: Information on a motion from frame (n−1) to frame n. This information is expressed by typically a motion vector or a matrix.
$\gamma_{NR}$: NR feedback coefficient
α: α map value used as a blending coefficient (1 for a successful motion-compensation area and 0 for an unsuccessful motion-compensation area)

By referring to FIG. 2, the above description has explained the configuration of the basic noise reduction processing circuit also referred to as an NR circuit and the processing carried out by the circuit.

It is to be noted that the basic super-resolution processing circuit also referred to as an SR circuit is already generally known as an existing circuit. The configuration of the SR circuit and the processing carried out by the circuit have been described earlier by referring to FIG. 1.

The present invention provides an image processing apparatus for carrying out the super-resolution processing performed by typically the SR circuit also referred to as the super-resolution processing circuit shown in FIG. 1 and the noise reduction processing performed by typically the NR circuit also referred to as the noise reduction processing circuit shown in FIG. 2.

The following description explains a typical configuration of the first embodiment implementing an image processing apparatus for carrying out the noise reduction processing in addition to the super-resolution processing.

First of all, the image processing apparatus according to the first embodiment can be configured by combining the following modified-configuration circuits with each other:
(a): Modified-configuration NR circuit (noise reduction processing circuit having a modified circuit configuration)
(b): Modified-configuration SR circuit (super-resolution processing circuit having a modified circuit configuration)

These modified-configuration circuits are explained as follows.

The modified-configuration NR circuit (a) serving as a noise reduction processing circuit having a modified circuit configuration as shown in FIG. 3 is obtained by modifying the existing circuit configuration of the NR circuit shown in FIG. 2 to serve as a noise reduction processing circuit to a circuit configuration of the SR circuit shown in FIG. 1 to serve as a super-resolution processing circuit.

The modified-configuration SR circuit (b) serving as a super-resolution processing circuit having a modified circuit configuration as shown in FIG. 4 is obtained by modifying the existing circuit configuration of the SR circuit shown in FIG. 1 to serve as a super-resolution processing circuit to a circuit configuration close to the circuit configuration of the modified-configuration NR circuit (a).

The modified-configuration NR circuit is explained by referring to FIG. 3 whereas the modified-configuration SR circuit is explained by referring to FIG. 4 as follows.

(a): Modified-Configuration NR Circuit (Noise Reduction Processing Circuit Having a Modified Circuit Configuration)

As described above, the modified-configuration NR circuit serving as a noise reduction processing circuit having a modified circuit configuration is obtained by modifying the existing circuit configuration of the NR circuit shown in FIG. 2 to serve as a noise reduction processing circuit to a circuit configuration employing a blending processing section like the existing circuit configuration of the SR circuit shown in FIG. 1 to serve as a super-resolution processing circuit. The circuit configuration of the modified-configuration NR circuit is explained by referring to FIG. 3 as follows.

The modified-configuration NR circuit serving as an image processing apparatus 100 shown in FIG. 3 is an image processing apparatus for carrying out the noise reduction processing in the same way as the noise reduction processing circuit 50 shown in FIG. 2.

The configuration of the image processing apparatus 100 shown in FIG. 3 and processing carried out by the apparatus are explained as follows. In the image processing apparatus 100, a low-resolution input image ($g_n$) 111 to be processed is supplied to an up-sampling section 101 for carrying out a resolution conversion process in order to generate an enlarged image. The up-sampling section 101 carries out the resolution conversion process in order to generate the enlarged image by executing typically processing to set one pixel at four pixels for example.

A motion-inference/motion-compensated-image generation section 102 detects the magnitude of a motion from a processed image $f_{n-1}$ of the immediately preceding frame to a high-resolution up-sampled image obtained as a result of the up-sampling processing carried out by the up-sampling section 101 on the low-resolution input image ($g_n$) 111. It is to be noted that the processed image $f_{n-1}$ of the immediately preceding frame is a processed frame obtained as a result of noise reduction processing.

The motion-inference/motion-compensated-image generation section 102 computes the magnitude of a motion from a processed image $f_{n-1}$ of the immediately preceding frame to a high-resolution up-sampled image obtained as a result of the up-sampling processing carried out by the up-sampling section 101 on the low-resolution input image ($g_n$) 111. To put it concretely, the motion-inference/motion-compensated-image generation section 102 computes a motion vector between the processed image $f_{n-1}$ and the high-resolution up-sampled image. Then, the motion-inference/motion-compensated-image generation section 102 carries out MC (motion compensation) processing on the processed image of the immediately preceding frame by making use of the computed motion vector. To put it in detail, the motion-inference/motion-compensated-image generation section 102 carries out the MC processing on the processed image in order to generate a motion compensation result image setting the photographing object at the same position as the photographing object in the high-resolution up-sampled image. As described before, however, in an unsuccessful motion compensation area such as an area where the photographing object is moving, the position of the photographing object in the motion compensation result image is shifted from the position of the photographing object in the high-resolution up-sampled image obtained as a result of the up-sampling processing carried out by the up-sampling section 101 on the low-resolution input image ($g_n$) 111.

A motion determination section 103 compares the motion-compensated image obtained as a result of the MC (motion compensation) processing carried out by the motion-inference/motion-compensated-image generation section 102 on the immediately preceding frame with a high-resolution up-sampled image obtained as a result the up-sampling processing carried out by the up-sampling section 101 on the low-resolution input image ($g_n$) 111 in order to detect the unsuccessful motion-compensation area defined as an area to which the MC processing may not be well applied as described above. For example, the unsuccessful motion-compensation area is generated on an image portion in which the photographing object itself is moving as described earlier.

As an output of the motion determination section 103, the motion determination section 103 generates motion area information referred to as an α map [0:1] for distinguishing a successful motion-compensation area from an unsuccessful motion-compensation area. A successful motion-compensation area is an area in which a motion compensation result image generated by the motion-inference/motion-compensated-image generation section 102 on the basis of the processed image $f_{n-1}$ of the immediately preceding frame sets the photographing object at the same position as the photographing object in the high-resolution up-sampled image obtained as a result of the up-sampling processing carried out by the up-sampling section 101 on the low-resolution input image ($g_n$) 111. On the other hand, an unsuccessful motion-compensation area is an area in which a motion compensation result image generated on the basis of the processed image $f_{n-1}$ of the immediately preceding frame does not set the photographing object at the same position as the photographing object in the high-resolution up-sampled image obtained as a result of the up-sampling processing carried out by the up-sampling section 101 on the low-resolution input image ($g_n$) 111.

The motion area information referred to as an α map [0:1] is a map having a value varying in the range 1 to 0 in accordance with the degree of confidence for the successful motion-compensation area and the unsuccessful motion-compensation area. In a simple application for example, the value of the α map [0:1] for an area is set at 1 in order to indicate that the area is a successful motion-compensation area with the highest degree of confidence or set at 0 in order to indicate that the area is an unsuccessful motion-compensation area with the highest degree of confidence.

A blending processing section 104 receives a motion compensation result image generated by the motion-inference/motion-compensated-image generation section 102 for the processed image $f_{n-1}$— of the immediately preceding frame, a high-resolution up-sampled image obtained as a result of the up-sampling processing carried out by the up-sampling section 101 on the input image ($g_n$) 111 and the motion area information referred to as an α map [0:1] generated by the motion determination section 103.

The blending processing section 104 makes use of the received inputs described above to output a blended image obtained as a result of blending processing carried out on the basis of an equation given as follows:

Blended image=(1−α)(high-resolution up-sampled image)+α(motion compensation result image)

In the above equation, reference symbol a denotes the aforementioned α map [0:1] having a value in the range 0 to 1. The value of the α map [0:1] is a blending coefficient α of the motion compensation result image. The blending coefficient α is used as a weight assigned to the motion compensation result image in the blending processing. By carrying out the blending processing, it is possible to generate a blended image by making use of an increased blending coefficient α as a weight assigned to the motion compensation result image for a successful motion-compensation area but a decreased blending coefficient α as a weight assigned to the motion compensation result image for an unsuccessful motion-compensation area.

A multiplier 105 carries out an operation to multiply the blended image generated by the blending processing section 104 by a product $\alpha\gamma_{NR}$ obtained as a result of multiplying the value α of the motion area information referred to as an α map generated by the motion determination section 103 by $\gamma_{NR}$. It is to be noted that the value α of the motion area information is referred to as a blending coefficient α whereas reference symbol $\gamma_{NR}$ used in the term expressing the product $\alpha\gamma_{NR}$ denotes an NR feedback coefficient determined in advance typically by the user with a high degree of freedom. As is obvious from the third line of Eq. (3) to be described later, the NR feedback coefficient $\gamma_{NR}$ is a weight assigned to the blended image whereas a coefficient $(1-\gamma_{NR})$ is a weight assigned to the up-sampled image, which is output by the up-sampling section 101 as a result of up-sampling processing carried out on the input image ($g_n$) 111, in an operation to add the blended image to the up-sampled image.

A multiplier 106 carries out an operation to multiply the high-resolution up-sampled image obtained as a result of the up-sampling processing carried out by the up-sampling section 101 on the input image ($g_n$) 111 by a coefficient $(1-\alpha\gamma_{NR})$ where reference symbol a denotes the blending coefficient which is the value of the motion area information referred to as an α map generated by the motion determination section 103 whereas reference symbol $\gamma_{NR}$ denotes the NR feedback coefficient described above.

An adder 107 carries out an operation to add the image output by the multiplier 105 to the image output by the multiplier 106 in order to generate an NR processing result image ($f_n^{NR}$) 112 which is the output image of the image processing apparatus 100. That is to say, the adder 107 carries out blending processing based on an equation given below on the images output by the multiplier 105 and the multiplier 106 in order to generate a blended image as the NR processing result image ($f_n^{NR}$) 112.

NR processing-result image=$(1-\alpha\gamma_{NR})$(up-sampled input image)+$\alpha\gamma_{NR}$(motion compensation result image for processed image of immediately preceding frame)

This blending processing is processing carried out by making use of an increased blending coefficient $\alpha\gamma_{NR}$ as a weight assigned to the motion compensation result image obtained for a processed image of the immediately preceding frame in the case of a successful motion-compensation area or a decreased blending coefficient $\alpha\gamma_{NR}$ as a weight assigned to the motion compensation result image obtained for a processed image of the immediately preceding frame in the case of an unsuccessful motion-compensation area. By carrying out the blending processing, the adder 107 is capable of generating the NR processing result image ($f_n^{NR}$) 112 which is the output image of the image processing apparatus 100.

The processing carried out by the image processing apparatus 100 shown in FIG. 3 can be expressed by Eq. (3) given as follows.

$$f_n^{NR} = \alpha\gamma_{NR}W_n f_{n-1}^{NR} + (1-\alpha\gamma_{NR})H^T D^T g_n \quad (3)$$
$$= \gamma_{NR}(\alpha W_n f_{n-1}^{NR} + (1-\alpha)H^T D^T g_n) + (1-\gamma_{NR})H^T D^T g_n$$
$$= \gamma_{NR}(W_n f_{n-1}^{NR})' + (1-\gamma_{NR})H^T D^T g_n$$

It is to be noted that a variety of reference symbols used in Eq. (3) given above denote parameters described as follows.

n: Frame number. For example, frames (n−1) and n are consecutive frames of a moving image.

$g_n$: Input image (a low-resolution image of frame n) $f_n^{NR}$: Reduced-noise image of frame n (an image obtained as a result of noise reduction processing for frame n)

$f_{n-1}^{NR}$: Reduced-noise image of frame n−1 (an image obtained as a result of noise reduction processing for frame n−1)

$W_n$: Information on a motion from frame (n−1) to frame n. This information is expressed by typically a motion vector or a matrix.

H: Blur addition processing (blur filter matrix)

D: Down-sampling processing (down-sampling processing matrix)

$(W_n f_{(n-1)}^{NR})'$: Blended image output by the blending processing section $\gamma_{NR}$: NR feedback coefficient $H^T$: Transposed matrix of matrix H $D^T$: Transposed matrix of matrix D α: α map value used as a blending coefficient (1 for a successful motion-compensation area and 0 for an unsuccessful motion-compensation area)

It is to be noted that the image output by the up-sampling section 101 is expressed by the term $H^T D^T g_n$ appearing at the end of the expression on the right hand side of Eq. (3). On the other hand, the image output by the blending processing section 104 is expressed by Eq. (4) given as follows:

$$(W_n f_{n-1}^{NR})' = \alpha W_n f_{n-1}^{NR} + (1-\alpha)H^T D^T g_n \quad (4)$$

The image output by the image processing apparatus 100 shown in FIG. 3 is a result of the noise reduction processing carried out by all circuit configuration components of the NR circuit which is basically a circuit for carrying out the noise reduction processing as explained earlier by referring to FIG. 2.

In addition, the image processing apparatus 100 shown in FIG. 3 is configured to also employ the up-sampling section 101 and the blending processing section 104 which are sections included in the super-resolution processing circuit explained earlier by referring to FIG. 1.

(b): Modified-Configuration SR Circuit (a Super-Resolution Processing Circuit Having a Modified Circuit Configuration)

By referring to FIG. 4, the following description explains a modified-configuration SR circuit which is a super-resolution processing circuit having a modified circuit configuration. As described earlier, the modified-configuration SR circuit shown in FIG. 4 is obtained by modifying the circuit configuration of the SR circuit shown in FIG. 1 to serve as a super-resolution processing circuit to a circuit configuration close to the circuit configuration of the modified-configuration NR circuit explained above in sub-chapter (a) by referring to FIG. 3.

In the same way as the super-resolution processing apparatus 10 shown in FIG. 1, a modified-configuration SR circuit serving as an image processing apparatus 150 shown in FIG. 4 receives a low-resolution input image ($g_n$) 131 and carries out super-resolution processing in order to output a high-resolution image $f_n$ which is an SR-processed image 132.

The image processing apparatus 150 carries out processing described as follows. An up-sampling section 151 receives the low-resolution input image ($g_n$) 131 to be subjected to processing to raise the resolution. The up-sampling section 151 carries out a pixel-count conversion process to raise the number of pixels included in the low-resolution input image ($g_n$) 131 in so-called image enlargement processing. To put it concretely, the up-sampling section 151 carries out the image enlargement processing to adjust the number of pixels included in the low-resolution input image ($g_n$) 131 to the number of pixels included in an SR-processed image ($f_n$) 132 which is a high-resolution image to be generated. For example, the up-sampling section 151 carries out the image enlargement processing to divide every pixel of the low-resolution input image ($g_n$) 131 into a plurality of pixels included in the SR-processed image ($f_n$) 132.

A motion-inference/motion-compensated-image generation section 152 detects the magnitude of a motion from a high-resolution image ($f_{n-1}$) generated in the processing carried out on an immediately preceding frame to a high-resolution up-sampled image obtained as a result of the up-sampling processing carried out by the up-sampling section 151 on the low-resolution input image ($g_n$) 131. To put it concretely, the motion-inference/motion-compensated-image generation section 152 computes a motion vector between the high-resolution image ($f_{n-1}$) and the high-resolution up-sampled image. Then, by making use of the computed motion vector, the motion-inference/motion-compensated-image generation section 152 carries out MC (motion compensation) processing on the high-resolution image ($f_{n-1}$). To put it in detail, the motion-inference/motion-compensated-image generation section 152 carries out the MC processing on the high-resolution image ($f_{n-1}$) in order to generate a motion compensation result image setting the photographing object at the same position as the photographing object in the high-resolution up-sampled image obtained as a result of the up-sampling processing carried out by the up-sampling section 151 on the low-resolution input image ($g_n$) 131.

A motion determination section 153 compares the motion-compensated high-resolution image obtained as a result of the MC processing carried out by the motion-inference/motion-compensated-image generation section 152 with a high-resolution up-sampled image obtained as a result of the up-sampling processing carried out by the up-sampling section 151 on the low-resolution input image ($g_n$) 131 in order to detect an area to which the MC processing may not be applied well. When the photographing object itself is moving for example, an unsuccessful motion-compensation area is generated. The unsuccessful motion-compensation area is the area to which the MC processing may not be applied well.

The motion determination section 153 generates motion area information referred to as an $\alpha$ map [0:1] for distinguishing a successful motion-compensation area from an unsuccessful motion-compensation area. A successful motion-compensation area is an area in which a motion compensation result image generated by the motion-inference/motion-compensated-image generation section 152 on the basis of the high-resolution image $f_{n-1}$ of the immediately preceding frame sets the photographing object at the same position as the photographing object in the high-resolution up-sampled image obtained as a result of the up-sampling processing carried out by the up-sampling section 151 on the low-resolution input image ($g_n$) 131. On the other hand, an unsuccessful motion-compensation area is an area in which a motion compensation result image generated on the basis of the high-resolution image $f_{n-1}$ of the immediately preceding frame does not set the photographing object at the same position as the photographing object in the high-resolution up-sampled image obtained as a result of the up-sampling processing carried out by the up-sampling section 151 on the low-resolution input image ($g_n$) 131. The motion area information referred to as an $\alpha$ map [0:1] is $\alpha$ map having a value varying in the range 1 to 0 in accordance with the degree of confidence for the successful motion-compensation area and the unsuccessful motion-compensation area. In a simple application for example, the value of the $\alpha$ map [0:1] for an area is set at 1 in order to indicate that the area is a successful motion-compensation area with the highest degree of confidence or set at 0 in order to indicate that the area is an unsuccessful motion-compensation area with the highest degree of confidence.

A blending processing section 154 receives a motion compensation result image generated by the motion-inference/motion-compensated-image generation section 152, on the basis of the high-resolution image $f_{n-1}$ of the immediately preceding frame, a high-resolution up-sampled image obtained as a result of the up-sampling processing carried out by the up-sampling section 151 on a low-resolution input image ($g_n$) 131 and the motion area information referred to as an $\alpha$ map [0:1] generated by the motion determination section 153.

The blending processing section 154 makes use of the received inputs described above to output a blended image obtained as a result of blending processing carried out on the basis of an equation given as follows:

$$\text{Blended image} = (1-\alpha)(\text{high-resolution up-sampled image}) + \alpha(\text{motion compensation result image})$$

In the above equation, reference symbol a denotes the aforementioned $\alpha$ map [0:1] having a value in the range 0 to 1. The value of the $\alpha$ map [0:1] is a blending coefficient $\alpha$ of the motion compensation result image. The blending coefficient $\alpha$ is used as a weight assigned to the motion compensation result image in the blending processing. By carrying out the blending processing, it is possible to generate a blended image by making use of an increased blending coefficient $\alpha$ as a weight assigned to the motion compensation result image for a successful motion-compensation area but a decreased blending coefficient $\alpha$ as a weight assigned to the motion compensation result image for an unsuccessful motion-compensation area.

The configuration of an output-image generation section 170 employed in the image processing apparatus 150 shown in FIG. 4 is different from that employed in the super-resolution processing apparatus 10 shown in FIG. 1. To put it concretely, the output-image generation section 170 employed in the image processing apparatus 150 is obtained by modifying the configuration in the super-resolution processing apparatus 10 as follows.

The super-resolution processing apparatus 10 shown in FIG. 1 employs two up-sampling sections, i.e., the up-sampling section 11 and the up-sampling section 18. In the configuration of the image processing apparatus 150 shown in FIG. 4, on the other hand, the up-sampling section 11 and the up-sampling section 18 are combined into the up-sampling section 151.

In addition, the down-sampling section 16 and the subtractor 17 which are shown in FIG. 1 are replaced by an integration filter 171 also referred to as a poly-phase filter 171 in the configuration shown in FIG. 4.

The integration filter (poly-phase filter) 171 carries out down-sampling processing and up-sampling processing. The down-sampling processing is carried out in order to reduce the resolution of the blended image generated by the blending processing section 154 to the first resolution which is a low resolution. That is to say, the down-sampling processing is carried out in order to reduce the number of pixels composing the blended image to the number of pixels composing an image having the first resolution. On the other hand, the up-sampling processing is carried out in order to increase the resolution of the blended image to the second resolution which is a high resolution. That is to say, the up-sampling processing is carried out in order to increase the number of pixels composing the blended image to the number of pixels composing an image having the second resolution. The integration filter (poly-phase filter) 171 is typically a poly-phase filter for carrying out a filtering process of convolving a value varying from phase to phase.

It is to be noted that the configuration of the output-image generation section 170 is designed also to employ a multiplier 172, a subtractor 173, a multiplier 174 and an adder 175. The multiplier 172 carries out an operation to multiply the image output by the integration filter (poly-phase filter) 171 by the SR feedback coefficient $\gamma_{SR}$ set in advance. The subtractor 173 carries out an operation to subtract the product output by the multiplier 172 from the blended image output by the blending processing section 154.

The difference output by the subtractor 173 is supplied to the adder 175.

The multiplier 174 carries out an operation to multiply the high-resolution up-sampled image obtained as a result of the up-sampling processing carried out on the input low-resolution input image ($g_n$) 131 in the up-sampling section 151 by the SR feedback coefficient $\gamma_{SR}$. The adder 175 carries out an operation to add an SR feedback value output by the multiplier 174 to the image output by the subtractor 173 in order to generate an SR-processed image ($f_n$) 132 as the image output by the image processing apparatus 150.

The processing carried out by the image processing apparatus 150 shown in FIG. 4 can be expressed by Eq. (5) given as follows.

$$f_n^{SR} = (W_n f_{n-1}^{SR})' + \gamma_{SR} H^T D^T (g_n - DH(W_n f_{n-1}^{SR})') \quad (5)$$
$$= (W_n f_{n-1}^{SR})' - \gamma_{SR} H^T D^T DH(W_n f_{n-1}^{SR})' + \gamma_{SR} H^T D^T g_n$$
$$= (I - \gamma_{SR} H^T D^T DH)(W_n f_{n-1}^{SR})' + \gamma_{SR} H^T D^T g_n$$

The expression on the right hand side on the first line of Eq. (5) is the same as the expression of Eq. (1) expressing the processing carried out by the super-resolution processing apparatus 10 shown in FIG. 1. The expression on the second line is derived from the expression on the right hand side on the first line whereas the expression on the third line is derived from the expression on the second line. It is the expression on the third line that expresses the processing carried out by the image processing apparatus 150 shown in FIG. 4.

That is to say, the up-sampling section 151 carries out inverse blur addition processing ($H^T$) and processing corresponding to the up-sampling processing ($D^T$). As shown in FIG. 4, the image output by the up-sampling section 151 is expressed by the following term: $H^T D^T g_n$ As described above, the integration filter (poly-phase filter) 171 carries out down-sampling processing and up-sampling processing. The down-sampling processing is carried out in order to reduce the resolution of the blended image generated by the blending processing section 154 to the first resolution which is a low resolution. That is to say, the down-sampling processing is carried out in order to reduce the number of pixels composing the blended image to the number of pixels composing an image having the first resolution. On the other hand, the up-sampling processing is carried out in order to increase the resolution of the blended image to the second resolution which is a high resolution. That is to say, the up-sampling processing is carried out in order to increase the number of pixels composing the blended image to the number of pixels composing an image having the second resolution. The integration filter (poly-phase filter) 171 is typically a poly-phase filter for carrying out a filtering process of convolving a value varying from phase to phase.

The filtering process can be expressed by the following term: $H^T D^T DH$. Thus, the image output by the integration filter (poly-phase filter) 171 can be expressed by the following term $(H^T D^T DH)(W_n f_{n-1}^{SR})'$.

The image output by the subtractor 173 shown in FIG. 4 can thus be expressed by the following expression:

$$(1 - \gamma_{SR} H^T D^T DH)(W_n f_{n-1}^{SR})'$$

The above expression is expression (A) shown in FIG. 4 or the first term of the expression on the third line of Eq. (5).

On the other hand, the image output by the multiplier 174 can be expressed by the following term:

$$\gamma_{SR} H^T D^T g_n$$

The above term is expression B shown in FIG. 4 or the second term of the expression on the third line of Eq. (5).

As a result, since the image output by the adder 175 is the sum of the images output by the subtractor 173 and the multiplier 174, the image output by the adder 175 can be expressed by the following equation:

$$f_n^{SR} = (1 - \gamma_{SR} H^T D^T DH)(W_n f_{n-1}^{SR})' + \gamma_{SR} H^T D^T g_n$$

The above equation is the third line of Eq. (5) given earlier.

As is obvious from the derivation of Eq. (5), the above equation expresses processing equivalent to the processing carried out by the super-resolution processing apparatus 10 shown in FIG. 1. Thus, by adoption of the configuration shown in FIG. 4, the super-resolution processing result image ($f_n^{SR}$) 132 can be output.

In the image processing apparatus 150 shown in FIG. 4, the filtering process is carried out by the up-sampling section 151 and the integration filter (poly-phase filter) 171. In comparison with the configuration shown in FIG. 1, the up-sampling section 151 is obtained by combining the up-sampling section 11 and the up-sampling section 18 which are employed in the configuration shown in FIG. 1 whereas the integration filter (poly-phase filter) 171 is a substitute for the down-sampling section 16 and the subtractor 17 which are employed in the configuration shown in FIG. 1. Thus, while the portion requiring the execution of the filtering process is sustained, the hardware configuration of the image processing apparatus 150 shown in FIG. 4 is more compact than that of the super-resolution processing apparatus 10 shown in FIG. 1. As a result, the cost can be reduced and the processing can also be carried out with a high degree of efficiency as well.

(c): Image Processing Apparatus Integrating the Modified-Configuration NR Circuit Shown in FIG. 3 with the Modified-Configuration SR Circuit Shown in FIG. 4

Next, by referring to FIGS. 5A and 5B, the following description explains a typical configuration of an image processing apparatus obtained by integrating the image processing apparatus 100 shown in FIG. 3 to serve as the modified-configuration NR circuit with the image processing apparatus 150 shown in FIG. 4 to serve as the modified-configuration SR circuit.

FIGS. 5A and 5B are two explanatory block diagrams showing respectively two circuits described as follows. FIG.

5A is an explanatory block diagram showing the modified-configuration NR circuit shown in FIG. 3 to serve as a noise reduction processing circuit having a modified circuit configuration. On the other hand, FIG. 5B is an explanatory block diagram showing the modified-configuration SR circuit shown in FIG. 4 to serve as a super-resolution processing circuit having a modified circuit configuration.

By comparing the configuration shown in FIG. 5A with that shown in FIG. 5B, it is obvious that the following sections are employed in both the configurations: the up-sampling section, the motion-inference/motion-compensated-image generation section, the motion determination section and the blending processing section. The connections of the up-sampling section, the motion-inference/motion-compensated image generation section, the motion determination section and the blending processing section in the configuration shown in FIG. 5A are also identical with those in the configuration shown in FIG. 5B.

However, the remaining sections employed in the configuration shown in FIG. 5A are different from the remaining sections employed in the configuration shown in FIG. 5B. To put it concretely, an NR filter 181 employed in the modified-configuration NR circuit shown in FIG. 5A is different from an SR filter 182 employed in the modified-configuration SR circuit shown in FIG. 5B.

Nevertheless, images supplied to the NR filter 181 are the same as those supplied to the SR filter 182. That is to say, the blended image supplied by the blending processing section to the NR filter 181 in the configuration shown in FIG. 5A is the same as the blended image supplied by the blending processing section to the SR filter 182 in the configuration shown in FIG. 5B. In addition, the high-resolution up-sampled image supplied by the up-sampling section to the NR filter 181 in the configuration shown in FIG. 5A is also the same as the high-resolution up-sampled image supplied by the up-sampling section to the SR filter 182 in the configuration shown in FIG. 5B.

FIG. 6 is an explanatory block diagram showing a circuit obtained by integrating the NR filter 181 employed in the configuration shown in FIG. 5A as the remaining sections cited above with the SR filter 182 employed in the configuration shown in FIG. 5B as the remaining sections mentioned above. That is to say, FIG. 6 does not show the front-stage sections common to the configurations shown in FIGS. 5A and 5B. Instead of showing the front-stage sections common to the configurations shown in FIGS. 5A and 5B, FIG. 6 shows a configuration in which the blended image and the high-resolution up-sampled image are supplied to each of the NR filter 181 and the SR filter 182 from the blending processing section and the up-sampling section respectively.

In the circuit shown in FIG. 6, the image output by the NR filter 181 is the image output by the circuit shown in FIG. 5A. That is to say, the image output by the NR filter 181 is the image output by the modified-configuration NR circuit explained earlier by referring to FIG. 3. Thus, the image output by the NR filter 181 is a reduced-noise image obtained as a result of the noise-reduction processing carried out on the input image.

On the other hand, the image output by the SR filter 182 is the image output by the circuit shown in FIG. 5B. That is to say, the image output by the SR filter 182 is the image output by the modified-configuration SR circuit explained earlier by referring to FIG. 4. Thus, the image output by the SR filter 182 is a super-resolution processing-result image obtained as a result of the super-resolution processing carried out on the input image.

The circuit shown in FIG. 6 blends the image output by the NR filter 181 with the image output by the SR filter 182 at a blending ratio of $(\lambda/(1-\lambda))$, where reference symbol $\lambda$ denotes a blending coefficient used as a weight assigned to the image output by the NR filter 181, and outputs the blended image as the eventual output image.

A variety of images generated in the circuit shown in FIG. 6 are denoted by reference symbols explained as follows. Reference symbol $f_n^{NR}$ denotes the reduced-noise image output by the NR filter 181 whereas reference symbol $f_n^{SR}$ denotes the super-resolution image output by the SR filter 182. Reference symbol $f_n$ denotes the eventual output image described above. In the blending processing to generate the eventual output image $f_n$, the reduced-noise image $f_n^{NR}$ output by the NR filter 181 is multiplied by a weight equal to the blending coefficient $\lambda$ whereas the super-resolution image $f_n^{SR}$ output by the SR filter 182 is multiplied by a weight of $(1-\lambda)$.

That is to say, the eventual output image $f_n$ is expressed by the following equation:

$$f_n = \lambda f_n^{NR} + (1-\lambda) f_n^{SR}$$

The above equation is an equation expressing the processing carried out by the circuit shown in FIG. 6. The expression on the right hand side of Eq. (3) is substituted into the above equation to serve as a replacement for the reduced-noise image $f_n^{NR}$ whereas expression on the right hand side of Eq. (5) is substituted into the above equation to serve as a replacement for the super-resolution image $f_n^{SR}$ to result in Eq. (6) expressing details of the processing carried out by the circuit shown in FIG. 6 as follows.

$$\begin{aligned} f_n &= \lambda f_n^{NR} + (1-\lambda) f_n^{SR} \\ &= (\lambda \gamma_{NR} + (1-\lambda) - (1-\lambda)\gamma_{SR} H^T D^T DH)(W_n f_{n-1})' + \\ &\quad (\lambda(1-\gamma_{NR}) + (1-\lambda)\gamma_{SR}) H^T D^T g_n \end{aligned} \quad (6)$$

By configuring a circuit according to expanded Eq. (6) given above, it is possible to generate the output image $f_n$ as a result of carrying out both the super-resolution processing and the noise-reduction processing.

FIG. 7 is an explanatory block diagram showing a typical circuit configuration of an image processing apparatus 200 designed in accordance with to Eq. (6).

The configuration of the image processing apparatus 200 shown in FIG. 7 is a typical concrete configuration of the circuit shown in FIG. 6. That is to say, the image processing apparatus 200 generates an output image $f_n$ as a result of carrying out both the super-resolution processing and the noise-reduction processing.

The image processing apparatus 200 shown in FIG. 7 employs an up-sampling section 201, a motion-inference/motion-compensated-image generation section 202, a motion determination section 203 and a blending processing section 204 which have configurations identical with the configurations of their respective corresponding sections employed in the circuit shown in FIG. 5A and the configurations of their respective corresponding sections employed in the circuit shown in FIG. 5B. That is to say, the up-sampling section 201, the motion-inference/motion-compensated-image generation section 202, the motion determination section 203 and the blending processing section 204 are sections common to the image processing apparatus 100 for carrying out the noise reduction processing as explained earlier by referring to FIG. 3 and the image processing apparatus 150 for carrying out the super-resolution processing as explained earlier by referring to FIG. 4. These sections common to the image processing apparatus 100 and the image processing apparatus 150 compose a common configuration.

Sections provided at the rear stage of the image processing apparatus 200 shown in FIG. 7 receive a blended image and a high-resolution up-sampled image from the common configuration, processing the blended image and the high-resolution up-sampled image in order to generate a reduced-noise image as well as a super-resolution image. Then, the sections provided at the rear stage blend the reduced-noise image with the super-resolution image in order to generate the eventual output image.

The configuration of the image processing apparatus 200 shown in FIG. 7 and processing carried out by the apparatus are explained as follows.

The image processing apparatus 200 shown in FIG. 7 receives a low-resolution input image ($g_n$) 251 to be processed and carries out the super-resolution processing on the low-resolution input image ($g_n$) 251 in order to increase the resolution of the low-resolution input image ($g_n$) 251 and the noise reduction processing in order to decrease noises of the low-resolution input image ($g_n$) 251. Then, the image processing apparatus 200 generates the eventual output image from results of the super-resolution processing and the noise reduction processing. The eventual output image is an (SR+NR) processing result image ($f_n$) 252 shown in FIG. 7.

To put it in detail, first of all, the low-resolution input image ($g_n$) 251 to be processed is supplied to the up-sampling section 201. The up-sampling section 201 carries out a pixel-count conversion process also referred to as an image enlargement process in order to raise the resolution of the low-resolution input image ($g_n$) 251. To put it concretely, the up-sampling section 201 carries out the pixel-count conversion process also referred to as the image enlargement process in order to adjust the number of pixels composing the low-resolution input image ($g_n$) 251 to the number of pixels composing the (SR+NR) processing result image ($f_n$) 252 which is a high-resolution image to be eventually generated. For example, the up-sampling section 201 carries out the image enlargement process to divide every pixel of the low-resolution input image ($g_n$) 251 into a plurality of pixels of the (SR+NR) processing result image ($f_n$) 252. That is to say, the up-sampling section 201 carries out the so-called up-sampling processing to adjust the number of pixels composing the low-resolution input image ($g_n$) 251 having a low resolution to the number of pixels composing the (SR+NR) processing result image ($f_n$) 252 having a high resolution. The low resolution of the low-resolution input image ($g_n$) 251 is referred to as a first resolution whereas the high resolution of the (SR+NR) processing result image ($f_n$) 252 is referred to as a second resolution higher than the first resolution.

The motion-inference/motion-compensated-image generation section 202 detects the magnitude of a motion from a high-resolution image ($f_{n-1}$) generated in the processing carried out on an immediately preceding frame to a high-resolution up-sampled image obtained as a result of the up-sampling processing carried out by the up-sampling section 201 on the low-resolution input image ($g_n$) 251. To put it concretely, the motion-inference/motion-compensated-image generation section 202 computes a motion vector between high-resolution image ($f_{n-1}$) and the high-resolution up-sampled image. Then, by making use of the computed motion vector, the motion-inference/motion-compensated-image generation section 202 carries out MC (motion compensation) processing on the high-resolution image ($f_{n-1}$). To put it in detail, the motion-inference/motion-compensated-image generation section 202 carries out the MC processing on the high-resolution image ($f_{n-1}$) in order to generate a motion compensation result image setting the photographing object at the same position as the photographing object in the high-resolution up-sampled image obtained as a result of the up-sampling processing carried out by the up-sampling section 201 on the low-resolution input image ($g_n$) 251. It is to be noted that the processed high-resolution image ($f_{n-1}$) of the immediately preceding frame is an image obtained as a result of both the super-resolution processing carried out to raise the resolution from the low resolution to the high resolution and the noise reduction processing.

The motion determination section 203 compares the motion-compensated high-resolution image obtained as a result of the MC processing carried out by the motion-inference/motion-compensated-image generation section 202 with a high-resolution up-sampled image obtained as a result of the up-sampling processing carried out by the up-sampling section 201 on the low-resolution input image ($g_n$) 251 in order to detect an area to which the MC processing may not be applied well. When the photographing object itself is moving for example, an unsuccessful motion-compensation area is generated. The unsuccessful motion-compensation area is the area to which the MC processing may not be applied well.

The motion determination section 203 generates motion area information referred to as an α map [0:1] for distinguishing a successful motion-compensation area from an unsuccessful motion-compensation area. A successful motion-compensation area is an area in which a motion compensation result image generated by the motion-inference/motion-compensated-image generation section 202 on the basis of the high-resolution image $f_{n-1}$ of the immediately preceding frame sets the photographing object at the same position as the photographing object in the high-resolution up-sampled image obtained as a result of the up-sampling processing carried out by the up-sampling section 201 on the low-resolution input image ($g_n$) 251. On the other hand, an unsuccessful motion-compensation area is an area in which a motion compensation result image generated on the basis of the high-resolution image $f_{n-1}$ of the immediately preceding frame does not set the photographing object at the same position as the photographing object in the high-resolution up-sampled image obtained as a result of the up-sampling processing carried out by the up-sampling section 201 on the low-resolution input image ($g_n$) 251. The motion area information referred to as an α map [0:1] is a map having a value varying in the range 1 to 0 in accordance with the degree of confidence for the successful motion-compensation area and the unsuccessful motion-compensation area. In a simple application for example, the value of the α map [0:1] for an area is set at 1 in blending processing section 104 and an up-sampling section 101 in order to indicate that the area is a successful motion-compensation area with the highest degree of confidence or set at 0 in order to indicate that the area is an unsuccessful motion-compensation area with the highest degree of confidence.

The blending processing section 204 receives a motion compensation result image generated by the motion-inference/motion-compensated-image generation section 202 on the basis of the high-resolution image $f_{n-1}$ of the immediately preceding frame, a high-resolution up-sampled image obtained as a result of the up-sampling processing carried out by the up-sampling section 201 on a low-resolution input image ($g_n$) 251 and the motion area information referred to as an α map [0:1] generated by the motion determination section 203.

The blending processing section 204 makes use of the received inputs described above to output a blended image obtained as a result of blending processing carried out on the basis of an equation given as follows:

Blended image=$(1-\alpha)$(high-resolution up-sampled image)+$\alpha$(motion compensation result image)

In the above equation, reference symbol a denotes the aforementioned $\alpha$ map [0:1] having a value in the range 0 to 1. The value of the $\alpha$ map [0:1] is a blending coefficient $\alpha$ of the motion compensation result image. The blending coefficient $\alpha$ is used as a weight assigned to the motion compensation result image in the blending processing. By carrying out the blending processing, it is possible to generate a blended image by making use of an increased blending coefficient $\alpha$ as a weight assigned to the motion compensation result image for the successful motion-compensation area but a decreased blending coefficient $\alpha$ as a weight assigned to the motion compensation result image for the unsuccessful motion-compensation area.

In the image processing apparatus 200 shown in FIG. 7, circuits provided at the stage following the blending processing section 204 receive the blended image and the high-resolution up-sampled image, carrying out processing on the blended image and the high-resolution up-sampled image in order to generate the (SR+NR) processing result image ($f_n$) 252 cited earlier as the output image of the image processing apparatus 200. The output image of the image processing apparatus 200 is equivalent to a blended image obtained by blending a super-resolution processing-result image obtained as a result of the super-resolution processing carried out in order to increase the resolution of the low-resolution input image ($g_n$) 251 to a high resolution with a noise-reduction processing-result image obtained as a result of the noise reduction processing carried out in order to reduce noises of the low-resolution input image ($g_n$) 251. In the processing carried out on the blended image and the high-resolution up-sampled image, the output-image generation section 220 makes use of the NR filter 181 and the SR filter 182 which are shown in FIG. 6 as well as other processing sections.

As shown in FIG. 7, the output-image generation section 220 for generating the (SR+NR) processing result image ($f_n$) 252 equivalent to a blended image obtained by blending a super-resolution processing-result image with a noise-reduction processing-result image has an integration filter (poly-phase filter) 205 and other processing sections which include multipliers 211 to 213 as well as adders 214 and 215.

The following description explains processing carried out by the output-image generation section 220 provided at the stage following the blending processing section 204.

The blended image generated by the blending processing section 204 is supplied to the integration filter (poly-phase filter) 205 and a multiplier 211. The integration filter (poly-phase filter) 205 carries out the same processing as the integration filter (poly-phase filter) 171 explained earlier by referring to FIG. 4. That is to say, the integration filter (poly-phase filter) 205 carries out down-sampling processing and up-sampling processing. The down-sampling processing is carried out in order to reduce the number of pixels composing the blended image generated by the blending processing section 204 to the number of pixels composing an image corresponding to the input image having a first resolution which is a low resolution. On the other hand, the up-sampling processing is carried out in order to increase the number of pixels composing the blended image generated by the blending processing section 204 to the number of pixels composing an image corresponding to the output image having a second resolution which is a high resolution. The integration filter (poly-phase filter) 205 is typically a poly-phase filter for carrying out a filtering process of convolving a value varying from phase to phase.

Each of the multipliers 211 to 213 carries out an operation to multiply an input image supplied to the multiplier by a multiplier operand which is a parameter set in advance. To be more specific, the multiplier 211 carries out an operation to multiply the blended image generated by the blending processing section 204 by a parameter of $(\alpha\gamma_{NR}+(1-\lambda))$. The multiplier 212 carries out an operation to multiply an image generated by the integration filter (poly-phase filter) 205 by a parameter of $((1-\lambda)\gamma_{SR})$. The multiplier 213 carries out an operation to multiply the image generated by the up-sampling section 201 by a parameter of $(\lambda(1\gamma_{NR})+(1-\lambda)\gamma_{SR})$. In these expressions, reference symbol $\gamma_{NR}$ denotes an NR feedback coefficient used in the noise reduction processing, reference symbol $\gamma_{SR}$ denotes an SR feedback coefficient used in the super-resolution processing whereas reference symbol $\lambda$ denotes a blending coefficient used in the expression of a blending ratio of $(\lambda/(1-\lambda))$ adopted in the process of blending a reduced-noise image with a super-resolution image. The feedback coefficients $\gamma_{NR}$ and $\gamma_{SR}$ as well as the blending coefficient $\lambda$ each have a value determined in advance.

To put it in detail, the multiplier 211 carries out an operation to multiply the blended image $(W_n f_{n-1})'$ generated by the blending processing section 204 by a parameter of $(\lambda\gamma_{NR}+(1-\lambda))$ as described above in order to produce an image expressed by the following expression:

$$(\lambda\gamma_{NR}+(1-\lambda))\times(W_n f_{n-1})'$$

The multiplier 212 carries out an operation to multiply an image $(H^T D^T DH)(W_n f_{n-1})'$ generated by the integration filter (poly-phase filter) 205 by a parameter of $((1-\lambda)\gamma_{SR})$ as described above in order to produce an image expressed by the following expression:

$$((1-\lambda)\gamma_{SR})\times(H^T D^T DH(W_n f_{n-1})'))$$

The multiplier 213 carries out an operation to multiply the image $(H^T D^T g_n)$ generated by the up-sampling section 201 by a parameter of $(\lambda(1-\gamma_{NR})+(1-\lambda)\gamma_{SR})$ as described above in order to produce an image expressed by the following expression:

$$(\lambda(1-\gamma_{NR})+(1-\lambda)\gamma_{SR})\times H^T D^T g_n$$

The subtractor 214 carries out an operation to subtract the image output by the multiplier 212 from the image output by the multiplier 211 in order to produce an image expressed by the following expression:

$$((\lambda\gamma_{NR}+(1-\lambda))\times(W_n f_{n-1})')-((1-\lambda)\gamma_{SR})\times(H^T D^T DH)(W_n f_{n-1})')$$

The adder 215 carries out an operation to add the image output by the subtractor 214 to the image output by the multiplier 213 in order to produce an image expressed by the following expression:

$$((\lambda\gamma_{NR}+(1-\lambda))\times(W_n f_{n-1})')-(((1-\lambda)\gamma_{SR})\times(H^T D^T DH)(W_n f_{n-1})')+(\lambda(1-\gamma_{NR})+(1-\lambda)\gamma_{SR})\times(H^T D^T g_n)$$

The above expression can be rewritten into a simplified expression as follows:

$$((\lambda\gamma_{NR}+(1-\lambda))\times(W_n f_{n-1})')-(((1-\lambda)\gamma_{SR})\times(H^T D^T DH)(W_n f_{n-1})')+(\lambda(1-\gamma_{NR})+(1-\lambda)\gamma_{SR})\times H^T D^T g_n = (\lambda\gamma_{NR}+(1-\lambda))-(1-\lambda)\gamma_{SR}\times H^T D^T DH)(W_n f_{n-1})'+(\lambda(1-\gamma_{NR})+(1-\lambda)\gamma_{SR})-(1-\lambda)\gamma_{SR})\times H^T D^T g_n$$

Thus, on the basis of the expressions described above, the processing carried out by the image processing apparatus 200 shown in FIG. 7 can be expressed by Eq. (7) given as follows:

$$f_n = \lambda f_n^{NR} + (1-\lambda)f_n^{SR} \quad (7)$$

$$= (\lambda\gamma_{NR} + (1-\lambda) - (1-\lambda)\gamma_{SR}H^TD^TDH)(W_n f_{n-1})' +$$

$$(\lambda(1-\gamma_{NR}) + (1-\lambda)\gamma_{SR})H^TD^Tg_n$$

Eq. (7) is also shown at the bottom of FIG. 7.

Expressions (1) to (3) shown at the bottom of FIG. 7 express the aforementioned parameters used in the multiplication operations carried out by the multipliers 211 to 213 respectively as follows:

Expression (1) expresses the parameter $(\lambda\gamma_{NR}+(1-\lambda))$ used in the multiplication operation carried out by the multiplier 211.

Expression (2) expresses the parameter $((1-\lambda)\gamma_{SR})$ used in the multiplication operation carried out by the multiplier 212.

Expression (3) expresses the parameter $(\lambda(1-\gamma_{NR})+(1-\lambda)\gamma_{SR})$ used in the multiplication operation carried out by the multiplier 213.

As shown in FIG. 7, the blended image $(W_n f_{n-1})$ obtained as a result of the blending processing carried out by the blending processing section 204 is multiplied in the multiplier 211 by the parameter expressed by expression (1). The image $H^TD^TDH(W_n f_{n-1})'$ output by the integration filter (poly-phase filter) 205 is multiplied in the multiplier 212 by the parameter expressed by expression (2). The high-resolution up-sampled image $H^TD^Tg_n$ output by the up-sampling section 201 is multiplied in the multiplier 213 by the parameter expressed by expression (3).

Eq. (7) given above is of course the same equation as Eq. (6) on the basis of which the image processing apparatus 200 shown in FIG. 7 is designed. That is to say, the image processing apparatus 200 shown in FIG. 7 is a combination of the NR processing circuit shown in FIG. 5A and the SR processing circuit shown in FIG. 5B. In addition, the image processing apparatus 200 carries out the super-resolution processing to increase the resolution of the input low-resolution input image $(g_n)$ 251 and the noise reduction processing to reduce noises of the low-resolution input image $(g_n)$ 251, resulting in the (SR+NR) processing result image $(f_n)$ 252 as the output image.

1-2: Second Embodiment Combining a Noise Reduction Processing Circuit (NR Circuit) with a Super-Resolution Processing Circuit (SR Circuit) by Using the NR Circuit as a Base Configuration Next, the following description explains a second embodiment combining a noise reduction processing circuit also referred to as an NR Circuit disclosed in documents such as Japanese Patent Laid-open No. 2008-294601 with a super-resolution processing circuit also referred to as an SR Circuit by making use of the NR circuit as a base configuration.

As a modified-configuration noise reduction processing circuit also referred to as a modified-configuration NR circuit, there is already known a circuit explained before by referring to FIG. 2.

The first embodiment described above employs the super-resolution processing circuit also referred to as an SR circuit explained earlier by referring to FIG. 4. On the other hand, the second embodiment employs a super-resolution processing circuit obtained by further modifying the super-resolution processing circuit shown in FIG. 4 to a configuration shown in FIG. 8 as a configuration close to the modified-configuration NR circuit shown in FIG. 2.

A further-modified-configuration SR circuit serving as an image processing apparatus 300 shown in FIG. 8 receives a low-resolution input image $(g_n)$ 321 and carries out the super-resolution processing on the low-resolution input image $(g_n)$ 321 in order to generate a SR-processed image $(f_n)$ 322 also referred to as a super-resolution processing result image $(f_n)$ 322 in the same way as the super-resolution processing circuit also referred to as an SR circuit explained earlier by referring to FIG. 4.

The image processing apparatus 300 carries out processing described as follows. An up-sampling section 301 receives the low-resolution input image $(g_n)$ 321 to be subjected to processing to raise the resolution. The up-sampling section 301 carries out a pixel-count conversion process to raise the number of pixels included in the low-resolution input image $(g_n)$ 321 in so-called image enlargement processing. To put it concretely, the up-sampling section 301 carries out the image enlargement processing to adjust the number of pixels included in the low-resolution input image $(g_n)$ 321 to the number of pixels included in the SR-processed image $(f_n)$ 322 which is a high-resolution image to be generated. For example, the low-resolution input image $(g_n)$ 321 carries out the image enlargement processing by dividing every pixel of the low-resolution input image $(g_n)$ 321 into a plurality of pixels included in the SR-processed image $(f_n)$ 322. That is to say, the up-sampling section 301 carries out up-sampling processing to increase the number of pixels composing the low-resolution input image $(g_n)$ 321 having a low resolution referred to as a first resolution to the number of pixels composing an image having a high resolution referred to as a second resolution higher than the first resolution.

A motion-inference/motion-compensated-image generation section 302 detects the magnitude of a motion from a high-resolution image $(f_{n-1})$ generated in the processing carried out on an immediately preceding frame to a high-resolution up-sampled image obtained as a result of the up-sampling processing carried out by the up-sampling section 301 on the low-resolution input image $(g_n)$ 321. To put it concretely, the motion-inference/motion-compensated-image generation section 302 computes a motion vector between high-resolution image $(f_{n-1})$ and the high-resolution up-sampled image. Then, by making use of the computed motion vector, the motion-inference/motion-compensated-image generation section 302 carries out MC (motion compensation) processing on the high-resolution image $(f_{n-1})$. To put it in detail, the motion-inference/motion-compensated-image generation section 302 carries out the MC processing on the high-resolution image $(f_{n-1})$ in order to generate a motion compensation result image $W_n f_{n-1}^{SR}$ setting the photographing object at the same position as the photographing object on a high-resolution up-sampled image obtained as a result of the up-sampling processing carried out by the up-sampling section 301 on the low-resolution input image $(g_n)$ 321.

A motion determination section 303 compares the motion-compensated high-resolution image $W_n f_{n-1}^{SR}$ obtained as a result of the MC processing carried out by the motion-inference/motion-compensated-image generation section 302 with a high-resolution up-sampled image obtained as a result of the up-sampling processing carried out by the up-sampling section 301 on the low-resolution input image $(g_n)$ 321 in order to detect an area to which the MC processing may not be applied well. When the photographing object itself is moving for example, an unsuccessful motion-compensation area is generated. The unsuccessful motion-compensation area is the area to which the MC processing may not be applied well.

The motion determination section 303 generates motion area information referred to as an α map [0:1] for distinguishing a successful motion-compensation area from an unsuccessful motion-compensation area. A successful motion-compensation area is an area in which a motion compensation result image $W_n f_{n-1}^{SR}$ generated by the motion-inference/motion-compensated-image generation section 302 on the basis of the high-resolution image $f_{n-1}$ of the immediately preceding frame sets the photographing object at the same position as the photographing object in the high-resolution up-sampled image obtained as a result of the up-sampling processing carried out by the up-sampling section 301 on the low-resolution input image ($g_n$) 321. On the other hand, an unsuccessful motion-compensation area is an area in which a motion compensation result image $W_n f_{n-1}^{SR}$ generated on the basis of the high-resolution image $f_{n-1}$ of the immediately preceding frame does not set the photographing object at the same position as the photographing object in the high-resolution up-sampled image obtained as a result of the up-sampling processing carried out by the up-sampling section 301 on the low-resolution input image ($g_n$) 321. The motion area information referred to as an α map [0:1] is a map having a value varying in the range 1 to 0 in accordance with the degree of confidence for the successful motion-compensation area and the unsuccessful motion-compensation area. In a simple application for example, the value of the α map [0:1] for an area is set at 1 in order to indicate that the area is a successful motion-compensation area with the highest degree of confidence or set at 0 in order to indicate that the area is an unsuccessful motion-compensation area with the highest degree of confidence.

The motion-compensated high-resolution image $W_n f_{n-1}^{SR}$ obtained as a result of the MC processing carried out by the motion-inference/motion-compensated-image generation section 302 is further supplied to an integration filter (poly-phase filter) 304 and a subtractor 306. The integration filter (poly-phase filter) 304 carries out down-sampling processing and up-sampling processing. The down-sampling processing is carried out in order to reduce the number of pixels composing the motion-compensated high-resolution image $W_n f_{n-1}^{SR}$ generated by the motion-inference/motion-compensated-image generation section 302 to the number of pixels composing an image having a first resolution which is a low resolution. On the other hand, the up-sampling processing is carried out in order to increase the number of pixels composing the motion-compensated high-resolution image $W_n f_{n-1}^{SR}$ generated by the motion-inference/motion-compensated-image generation section 302 to the number of pixels composing an image having a second resolution which is a high resolution. The integration filter (poly-phase filter) 304 is typically a poly-phase filter for carrying out a filtering process of convolving a value varying from phase to phase.

A multiplier 305 carries out an operation to multiply an image output by the integration filter (poly-phase filter) 304 by an SR feedback coefficient $\gamma_{SR}$.

The subtractor 306 carries out an operation to subtract an image output by the multiplier 305 from the motion-compensated high-resolution image $W_n f_{n-1}^{SR}$ generated by the motion-inference/motion-compensated-image generation section 302.

A multiplier 307 carries out an operation to multiply an image output by the subtractor 306 by a motion-area determination parameter α which is the value of the α map [0:1] output by the motion determination section 303. As described above, the motion-area determination parameter α has a value in a range between an upper limit of 1 indicating a successful motion-compensation area and a lower limit of 0 indicating an unsuccessful motion-compensation area.

A multiplier 308 carries out an operation to multiply a high-resolution up-sampled image $H^T D^T g_n$ obtained as a result of the up-sampling processing carried out by the up-sampling section 301 on the low-resolution input image ($g_n$) 321 by a multiplier of $(1-\alpha+\alpha\gamma_{SR})$ where reference symbol a denotes the motion-area determination parameter described above whereas reference symbol $\gamma_{SR}$ denotes an SR feedback coefficient determined in advance.

An adder 309 carries out an operation to add an image output by the multiplier 307 to an image output by the multiplier 308 in order to generate an SR-processed image ($f_n$) 322 as the output of the further-modified-configuration super-resolution processing circuit serving as the image processing apparatus 300.

Thus, the processing carried out by the image processing apparatus 300 shown in FIG. 8 can be expressed by Eq. (8) given as follows:

$$\begin{aligned} f_n^{SR} &= (1-\gamma_{SR} H^T D^T DH)(W_n f_{n-1}^{SR})' + \gamma_{SR} H^T D^T g_n \\ &= (1-\gamma_{SR} H^T D^T DH)(\alpha W_n f_{n-1}^{SR} + (1-\alpha)H^T D^T g_n) + \\ &\quad \gamma_{SR} H^T D^T g_n \\ &= \alpha(1-\gamma_{SR} H^T D^T DH)W_n f_{n-1}^{SR} + (1-\alpha+\gamma_{SR})H^T D^T g_n - \\ &\quad (1-\alpha)\gamma_{SR} H^T D^T DHH^T D^T g_n \\ &\cong \alpha(1-\gamma_{SR} H^T D^T DH)W_n f_{n-1}^{SR} + (1-\alpha+\alpha\gamma_{SR})H^T D^T g_n \end{aligned} \quad (8)$$

An expression on the first line of Eq. (8) is the same as the expression expressing the processing carried out by the image processing apparatus 150 shown in FIG. 4. Expressions on the second to fifth lines of Eq. (8) are results of expanding the expression on the first line. The expression on the fifth line of Eq. (8) expresses the processing carried out by the image processing apparatus 300 shown in FIG. 8.

It is to be noted that, in the expansion from the expression on the second line to the expression on the third line of Eq. (8), the expression on the right hand side of Eq. (9) given below is substituted into Eq. (8) to serve as a replacement for the term $[(W_n f_{n-1}^{SR})']$ representing a blended image.

$$(W_n f_{n-1}^{SR})' = \alpha W_n f_{n-1}^{SR} + (1-\alpha)H^T D^T g_n \quad (9)$$

In addition, an approximation expressed by Eq. (10) given below is applied to the expansion from the expression on the fourth line to the expression on the fifth line of Eq. (8).

$$H^T D^T DHH^T D^T \approx H^T D^T \quad (10)$$

Next, by referring to FIGS. 9A and 9B, the following description explains the configuration of an image processing apparatus obtained by combining the noise reduction processing circuit 50 for carrying out the noise reduction processing as described earlier by referring to FIG. 2 with the further-modified-configuration super-resolution processing circuit serving as the image processing apparatus 300 for carrying out the super-resolution processing as described earlier by referring to FIG. 8.

FIGS. 9A and 9B are two explanatory block diagrams each showing an image processing circuit described as follows. FIG. 9A is an explanatory block diagram showing an NR (noise reduction) processing circuit which is the noise reduction processing circuit 50 for carrying out the noise reduction processing as described earlier by referring to FIG. 2. FIG. 9B is an explanatory block diagram showing a further-modified-configuration SR (super resolution) processing circuit which is the image processing apparatus 300 for carrying out the super-resolution processing as described earlier by referring to FIG. 8.

The NR processing circuit shown in FIG. 9A and the further-modified-configuration SR processing circuit shown in FIG. 9B have the following sections common to both the circuits: an up-sampling section, a motion-inference/motion-compensated-image generation section and a motion determination section. The configuration including the common sections and connections of the sections in the NR processing circuit shown in FIG. 9A are identical with those in the further-modified-configuration SR processing circuit shown in FIG. 9B.

However, the remaining sections employed in the configuration shown in FIG. 9A are different from the remaining sections employed in the configuration shown in FIG. 9B. To put it concretely, an NR filter 401 employed in the NR circuit shown in FIG. 9A is different from an SR filter 402 employed in the modified-configuration SR circuit shown in FIG. 9B.

Nevertheless, information supplied to the NR filter 401 is the same as that supplied to the SR filter 402. To put it concretely, both the NR filter 401 and the SR filter 402 receive a motion-compensated image of the immediately preceding frame from the motion-inference/motion-compensated-image generation section, an up-sampled image output by the up-sampling section and the value of the α map [0:1] output by the motion determination section to be used in processing of these two images from the motion determination section.

FIG. 10 is an explanatory block diagram showing a circuit obtained by integrating the NR filter 401 employed in the configuration shown in FIG. 9A as a portion of the remaining sections cited above with the SR filter 402 employed in the configuration shown in FIG. 9B as another portion of the remaining sections mentioned above. That is to say, FIG. 10 does not show the front-stage sections common to the configurations shown in FIGS. 9A and 9B. Instead of showing the front-stage sections common to the configurations shown in FIGS. 9A and 9B, FIG. 10 shows a configuration in which the motion-compensated image of the immediately preceding frame and the high-resolution up-sampled image are supplied to each of the NR filter 401 and the SR filter 402 from the motion-inference/motion-compensated-image generation section and the up-sampling section respectively.

In the circuit shown in FIG. 10, the image output by the NR filter 401 is the image output by the circuit shown in FIG. 9A. That is to say, the image output by the NR filter 401 is the image output by the NR circuit explained earlier by referring to FIG. 2. Thus, the image output by the NR filter 401 is a reduced-noise image obtained as a result of the noise-reduction processing carried out on the input image.

Also, the image output by the SR filter 402 is the image output by the circuit shown in FIG. 9B. That is to say, the image output by the SR filter 402 is the image output by the further-modified-configuration SR circuit explained earlier by referring to FIG. 8. Thus, the image output by the SR filter 402 is a super-resolution processing-result image obtained as a result of the super-resolution processing carried out on the input image.

The circuit shown in FIG. 10 blends the image output by the NR filter 401 with the image output by the SR filter 402 at a blending ratio of $(\lambda/(1-\lambda))$, where reference symbol $\lambda$ denotes a blending coefficient used as a weight assigned to the image output by the NR filter 401, and outputs the blended image as the eventual output image.

A variety of images generated in the circuit shown in FIG. 10 are denoted by reference symbols explained as follows. Reference symbol $f_n^{NR}$ denotes the reduced-noise image output by the NR filter 401 whereas reference symbol $f_n^{SR}$ denotes the super-resolution image output by the SR filter 402. Reference symbol $f_n$ denotes the eventual output image described above. In the blending processing to generate the eventual output image $f_n$, the reduced-noise image $f_n^{NR}$ output by the NR filter 401 is multiplied by the blending coefficient $\lambda$ whereas the super-resolution image $f_n^{SR}$ output by the SR filter 402 is multiplied by a weight of $(1-\lambda)$.

That is to say, the eventual output image $f_n$ is expressed by the following equation:

$$f_n = \lambda f_n^{NR} + (1-\lambda) f_n^{SR}$$

The above equation is an equation expressing the processing carried out by the circuit shown in FIG. 10.

$$\begin{aligned} f_n &= \lambda f_n^{NR} + (1-\lambda) f_n^{SR} \\ &= (\lambda \gamma_{NR} + (1-\lambda) - (1-\lambda)\gamma_{SR} H^T D^T DH)(W_n f_{n-1})' + \\ &\quad (\lambda(1-\gamma_{NR}) + (1-\lambda)\gamma_{SR}) H^T D^T g_n \end{aligned} \quad (11)$$

By configuring a circuit according to expanded Eq. (11) given above, it is possible to generate the output image $f_n$, as a result of carrying out both the super-resolution processing and the noise-reduction processing.

FIG. 11 is an explanatory block diagram showing a typical circuit configuration of an image processing apparatus 500 according to Eq. (11).

The configuration of the image processing apparatus 500 shown in FIG. 11 is a typical concrete configuration of the circuit shown in FIG. 10. That is to say, the image processing apparatus 500 generates an output image $f_n$ as a result of carrying out both the super-resolution processing and the noise-reduction processing.

The image processing apparatus 500 shown in FIG. 11 employs an up-sampling section 501, a motion-inference/motion-compensated-image generation section 502 and a motion determination section 503 which have configurations identical with the configurations of their respective corresponding sections employed in the circuit shown in FIG. 9A and the configurations of their respective corresponding sections employed in the circuit shown in FIG. 9B. That is to say, the up-sampling section 501, the motion-inference/motion-compensated-image generation section 502 and the motion determination section 503 are sections common to the noise reduction processing circuit 50 for carrying out the noise reduction processing as explained earlier by referring to FIG. 2 and the image processing apparatus 300 for carrying out the super-resolution processing as explained earlier by referring to FIG. 8. These sections common to the noise reduction processing circuit 50 and the image processing apparatus 300 compose a common configuration.

Sections provided at the rear stage of the image processing apparatus 500 shown in FIG. 11 receive the motion-compensated image of the immediately preceding frame and the high-resolution up-sampled image from the common configuration, processing the motion-compensated image of the immediately preceding frame and the high-resolution up-sampled image in order to generate a reduced-noise image as well as a super-resolution image. Then, the sections provided at the rear stage blend the reduced-noise image with the super-resolution image in order to generate the eventual output image.

The configuration of the image processing apparatus 500 shown in FIG. 11 and processing carried out by the apparatus are explained as follows.

The image processing apparatus 500 shown in FIG. 11 receives a low-resolution input image $(g_n)$ 521 to be processed and carries out the super-resolution processing on the low-resolution input image $(g_n)$ 521 in order to increase the resolution of the low-resolution input image $(g_n)$ 521 and the noise reduction processing in order to decrease noises of the low-resolution input image ($g_n$) 521. Then, the image processing apparatus 500 generates the eventual output image from results of the super-resolution processing and the noise reduction processing. The eventual output image is a (SR+NR) processing result image ($f_n$) 522 shown in FIG. 11.

To put it in detail, first of all, the low-resolution input image ($g_n$) 521 to be processed is supplied to the up-sampling section 501. The up-sampling section 501 carries out a pixel-count conversion process also referred to as an image enlargement process in order to raise the resolution of the low-resolution input image ($g_n$) 521. To put it concretely, the up-sampling section 501 carries out the pixel-count conversion process also referred to as the image enlargement process in order to adjust the number of pixels composing the low-resolution input image ($g_n$) 521 to the number of pixels composing the (SR+NR) processing result image ($f_n$) 522 which is a high-resolution image to be eventually generated. For example, the up-sampling section 501 carries out the image enlargement process by dividing every pixel of the low-resolution input image ($g_n$) 521 into a plurality of pixels of the (SR+NR) processing result image ($f_n$) 522. That is to say, the up-sampling section 501 carries out the so-called up-sampling processing to adjust the number of pixels composing the low-resolution input image ($g_n$) 521 having a low resolution to the number of pixels composing the (SR+NR) processing result image ($f_n$) 522 having a high resolution. The low resolution of the low-resolution input image ($g_n$) 521 is referred to as a first resolution whereas the high resolution of the (SR+NR) processing result image ($f_n$) 522 is referred to as a second resolution higher than the first resolution.

The motion-inference/motion-compensated-image generation section 502 detects the magnitude of a motion from a high-resolution image ($f_{n-1}$) generated in the processing carried out on an immediately preceding frame to a high-resolution up-sampled image obtained as a result of the up-sampling processing carried out by the up-sampling section 501 on the low-resolution input image ($g_n$) 521. To put it concretely, the motion-inference/motion-compensated-image generation section 502 computes a motion vector between high-resolution image ($f_{n-1}$) and the high-resolution up-sampled image. Then, by making use of the computed motion vector, the motion-inference/motion-compensated-image generation section 502 carries out MC (motion compensation) processing on the high-resolution image ($f_{n-1}$). To put it in detail, the motion-inference/motion-compensated-image generation section 502 carries out the MC processing on the high-resolution image ($f_{n-1}$) in order to generate a motion compensation result image setting the photographing object at the same position as the photographing object in the high-resolution up-sampled image obtained as a result of the up-sampling processing carried out by the up-sampling section 501 on the low-resolution input image ($g_n$) 521. It is to be noted that the processed high-resolution image ($f_{n-1}$) of the immediately preceding frame is an image obtained as a result of both the super-resolution processing carried out to raise the resolution from the low resolution to the high resolution and the noise reduction processing.

The motion determination section 503 compares the motion-compensated high-resolution image obtained as a result of the MC processing carried out by the motion-inference/motion-compensated-image generation section 502 with a high-resolution up-sampled image obtained as a result of the up-sampling processing carried out by the up-sampling section 501 on the low-resolution input image ($g_n$) 521 in order to detect an area to which the MC processing may not be applied well. When the photographing object itself is moving for example, an unsuccessful motion-compensation area is generated. The unsuccessful motion-compensation area is the area to which the MC processing may not be applied well.

The motion determination section 503 generates motion area information referred to as an α map [0:1] for distinguishing a successful motion-compensation area from an unsuccessful motion-compensation area. A successful motion-compensation area is an area in which a motion compensation result image generated by the motion-inference/motion-compensated-image generation section 502 on the basis of the high-resolution image $f_{n-1}$ of the immediately preceding frame sets the photographing object at the same position as the photographing object in the high-resolution up-sampled image obtained as a result of the up-sampling processing carried out by the up-sampling section 501 on the low-resolution input image ($g_n$) 521. On the other hand, an unsuccessful motion-compensation area is an area in which a motion compensation result image generated on the basis of the high-resolution image $f_{n-1}$ of the immediately preceding frame does not set the photographing object at the same position as the photographing object in the high-resolution up-sampled image obtained as a result of the up-sampling processing carried out by the up-sampling section 501 on the low-resolution input image ($g_n$) 521. The motion area information referred to as an α map [0:1] is a map having a value varying in the range 1 to 0 in accordance with the degree of confidence for the successful motion-compensation area and the unsuccessful motion-compensation area. In a simple application for example, the value of the α map [0:1] for an area is set at 1 in order to indicate that the area is a successful motion-compensation area with the highest degree of confidence or set at 0 in order to indicate that the area is an unsuccessful motion-compensation area with the highest degree of confidence.

A section provided at the rear stage of the image processing apparatus 500 shown in FIG. 11 is an output-image generation section 540. The output-image generation section 540 receives the motion-compensated image and the up-sampled image, carrying out processing on the motion-compensated image and the up-sampled image in order to generate the (SR+NR) processing result image ($f_n$) 522 as the output image of the image processing apparatus 500. The output image of the image processing apparatus 500 is equivalent to a blended image obtained by blending a super-resolution processing-result image obtained as a result of the super-resolution processing carried out in order to increase the resolution of the low-resolution input image ($g_n$) 521 to a high resolution with a noise reduction processing-result image obtained as a result the noise reduction processing carried out in order to reduce noises of the low-resolution input image ($g_n$) 521. In the processing carried out on the motion-compensated image and the up-sampled image, the output-image generation section 540 makes use of the NR filter 401 and the SR filter 402 which are shown in FIG. 10 as well as other processing sections.

To put it concretely, as shown in FIG. 11, the output-image generation section 540 for generating the (SR+NR) processing result image ($f_n$) 522 equivalent to the blended image obtained by blending the super-resolution processing-result image with the noise reduction processing-result image has an integration filter (poly-phase filter) 504 and the other processing sections including multipliers 505, 506, 508 and 509 as well as adders 507 and 510. Processing in the output-image generation section 540 is explained as follows.

The motion-compensated high-resolution image $W_n f_{n-1}$ obtained as a result of the MC processing carried out by the motion-inference/motion-compensated-image generation section 502 on the processed image $f_{n-1}$ of the immediately preceding frame is supplied to the integration filter (poly-phase filter) 504 and the multiplier 505. The integration filter (poly-phase filter) 504 carries out down-sampling processing and up-sampling processing in the same way as the integration filter (poly-phase filter) 304 explained earlier by referring to FIG. 8. The down-sampling processing is carried out in order to reduce the number of pixels composing the motion-compensated high-resolution image $W_n f_{n-1}$ obtained as a result of the MC processing carried out by the motion-inference/motion-compensated-image generation section 502 on the processed image $f_{n-1}$ of the immediately preceding frame to the number of pixels composing an image having a first resolution which is a low resolution. On the other hand, the up-sampling processing is carried out in order to increase the number of pixels composing the motion-compensated high-resolution image $W_n f_{n-1}$ obtained as a result of the MC processing carried out by the motion-inference/motion-compensated-image generation section 502 on the processed image $f_{n-1}$ of the immediately preceding frame to the number of pixels composing an image having a second resolution which is a high resolution. The integration filter (poly-phase filter) 504 is typically a poly-phase filter for carrying out a filtering process of convolving a value varying from phase to phase.

Each of the multipliers 505, 506, 508 and 509 carries out an operation to multiply an image supplied thereto by a parameter. To be more specific, the multiplier 505 carries out an operation to multiply an image supplied thereto by a parameter of $(\lambda\gamma_{NR}+(1-\lambda))$. The multiplier 506 carries out an operation to multiply an image supplied thereto by a parameter of $((1-\lambda)\gamma_{SR})$. The multiplier 508 carries out an operation to multiply an image supplied thereto by a parameter of $\alpha$. The multiplier 509 carries out an operation to multiply an image supplied thereto by a parameter of $(\lambda(1-\alpha\gamma_{NR})+(1-\lambda)(1-\alpha+\alpha\gamma_{SR}))$.

The expressions of the parameters described above include reference symbols described as follows. Reference symbol $\gamma_{NR}$ denotes an NR feedback coefficient of the NR (noise reduction) processing. Reference symbol $\gamma_{SR}$ denotes an SR feedback coefficient of the SR (super-resolution) processing. Reference symbol $\lambda$ denotes a blending coefficient of a blending ratio used in the process of blending the super-resolution processing-result image with the noise reduction processing-result image. Reference symbol $\alpha$ denotes an $\alpha$ map value in the range 1 indicating a successful motion-compensation area to 0 indicating an unsuccessful motion-compensation area.

The values of the coefficients described above are determined in advance.

To put it in detail, the multiplier 505 carries out an operation to multiply the motion-compensated high-resolution image $W_n f_{n-1}$ obtained as a result of the MC processing carried out by the motion-inference/motion-compensated-image generation section 502 on the processed image $f_{n-1}$ of the immediately preceding frame by a parameter of $(\lambda\gamma_{NR}(1-\lambda))$. That is to say, the multiplier 505 carries out a multiplication operation expressed by the following expression: $(\lambda\gamma_{NR}+(1-\lambda))\times(W_n f_{n-1})$.

The multiplier 506 carries out an operation to multiply a filtered image $H^T D^T DH(W_n f_{n-1})$ supplied thereto from the integration filter (poly-phase filter) 504 by a parameter of $((1-\lambda)\gamma_{SR})$. That is to say, the multiplier 506 carries out a multiplication operation expressed by the following expression: $((1-\lambda)\gamma_{SR})\times(H^T D^T DH(W_n f_{n-1}))$.

The multiplier 509 carries out an operation to multiply an up-sampled image $H^T D^T g_n$ supplied thereto from the up-sampling section 501 by a parameter of $(\lambda(1-\alpha\gamma_{NR})+(1-\lambda)(1-\alpha+\alpha\gamma_{SR}))$. That is to say, the multiplier 506 carries out a multiplication operation expressed by the following expression: $(\lambda(1-\alpha\gamma_{NR})+(1-\lambda)(1-\alpha+\alpha\gamma_{SR}))\times H^T D^T g_n$.

The subtractor 507 carries out an operation to subtract an image output by the multiplier 506 from an image output by the multiplier 505. That is to say, the subtractor 507 carries out a subtraction operation expressed by the following expression: $((\lambda\gamma_{NR}+(1-\lambda))\times(W_n f_{n-1}))-(((1-\lambda)\gamma_{SR})\times(H^T D^T DH(W_n f_{n-1})))$.

The multiplier 508 carries out an operation to multiply an image supplied thereto from the subtractor 507 by a parameter $\alpha$ having a value in the range 1 indicating a successful motion-compensation area to 0 indicating an unsuccessful motion-compensation area. That is to say, the multiplier 508 carries out a multiplication operation expressed by the following expression: $\alpha\times(((\lambda\gamma_{NR}+(1-\lambda))\times(W_n f_{n-1}))-(((1-\lambda)\gamma_{SR})\times(H^T D^T DH(W_n f_{n-1}))))=\alpha(\lambda\gamma_{NR}+(1-\lambda)(1-\lambda)\gamma_{SR}H^T D^T DH)W_n f_{n-1}$.

The adder 510 carries out an operation to add an image output by the multiplier 508 to an image output by the multiplier 509. That is to say, the adder 510 carries out an addition operation expressed by the following expression: $\alpha(\lambda\gamma_{NR}+(1-\lambda)-(1-\lambda)\gamma_{SR}H^T D^T DH)W_n f_{n-1}+(\lambda(1-\alpha\gamma_{NR})+(1-\lambda)(1-\alpha+\alpha\gamma_{SR}))\times H^T D^T g_n$.

Thus, on the basis of the expressions described above, the processing carried out by the image processing apparatus 500 shown in FIG. 11 can be expressed by Eq. (12) given as follows:

$$f_n = \lambda f_n^{NR} + (1-\lambda) f_n^{SR} \quad (12)$$
$$= \alpha(\lambda\gamma_{NR} + (1-\lambda) - (1-\lambda)\gamma_{SR} H^T D^T DH) W_n f_{n-1} +$$
$$(\lambda(1-\alpha\gamma_{NR}) + (1-\lambda)(1-\alpha+\alpha\gamma_{SR})) H^T D^T g_n$$

Eq. (12) is also shown at the bottom of FIG. 11.

Expressions (1) to (3) shown at the bottom of FIG. 11 express the aforementioned parameters used in the multiplication operations carried out by the multipliers 505, 506 and 509 respectively as follows:

Expression (1) expresses the parameter $(\lambda\gamma_{NR}+(1-\lambda))$ used in the multiplication operation carried out by the multiplier 505.

Expression (2) expresses the parameter $((1-\lambda)\gamma_{SR})$ used in the multiplication operation carried out by the multiplier 506.

Expression (3) expresses the parameter $(\lambda(1-\alpha\gamma_{NR})+(1-\lambda)(1-\alpha+\alpha\gamma_{SR}))$ used in the multiplication operation carried out by the multiplier 509.

Reference symbols used in the expressions expressing the parameters described above are explained as follows. Reference symbol $\alpha$ denotes a blending coefficient which is a parameter generated by the motion determination section 503. Reference symbol $H^T D^T DH$ expresses the processing carried out by the integration filter (poly-phase filter) 504. Reference symbol $(W_n f_{n-1})$ represents a preceding-frame motion-compensated image generated by the motion-inference/motion-compensated-image generation section 502. Reference symbol $H^T D^T g_n$ represents an up-sampled image output by the up-sampling section 501.

Eq. (12) given above is of course the same equation as Eq. (11) on the basis of which the image processing apparatus 500 shown in FIG. 11 is designed. That is to say, the image processing apparatus 500 shown in FIG. 11 is a combination of the NR processing circuit shown in FIG. 9A and the SR processing circuit shown in FIG. 9B. In addition, the image processing apparatus 500 carries out the super-resolution processing to increase the resolution of the input low-resolution input image ($g_n$) 521 and the noise reduction processing to reduce noises of the low-resolution input image ($g_n$) 521, resulting in the (SR+NR) processing result image ($f_n$) 522 as the output image.

2: Setting a Blending Ratio λ for a Noise Reduction Processing-Result Image and a Super-Resolution Processing-Result Image The descriptions given so far explain:

the first embodiment implementing the image processing apparatus 200 shown in FIG. 7 by combining a noise reduction processing circuit (also referred to as a NR circuit) with a super-resolution processing circuit (also referred to as a SR circuit) by making use of the SR circuit as a base configuration; and the second embodiment implementing the image processing apparatus 500 shown in FIG. 11 by combining a noise reduction processing circuit (or an NR circuit) with a super-resolution processing circuit (or an SR circuit) by making use of the NR circuit as a base configuration.

The image processing apparatus 200 and 500 are explained more as follows.

In either the image processing apparatus 200 or the image processing apparatus 500, a blending coefficient λ to be used as a weight assigned to a noise reduction processing-result image is set and an expression of (1−λ) is used as a weight assigned to a super-resolution processing-result image. Then, in accordance with these weights, processing to blend the noise reduction processing-result image with the super-resolution processing-result image is carried out in order to generate an eventual output image as follows:

$$f_n = \lambda f_n^{NR} + (1-\lambda) f_n^{SR}$$

where reference symbol $f_n$ denotes the eventual output image, reference symbol $f_n^{NR}$ denotes the noise reduction processing-result image, reference symbol $f_n^{SR}$ denotes the super-resolution processing-result image and reference symbol λ denotes the blending coefficient which has a value in the range 0 to 1.

The blending coefficient λ can be set at a constant in advance by the user. However, it is possible to adjust the value of the blending coefficient λ as follows. (a): Adjusting the blending coefficient in accordance with the ISO (International Organization for Standardization) sensitivity for each area unit of the input image For example, a noise table used in motion determination is used. For an area unit with a low ISO sensitivity, a number of noises are inferred. Thus, the blending coefficient λ to be used as the weight assigned to the NR (noise reduction) processing-result image is set at a large value.

(b): Adjusting the Blending Coefficient in Accordance with the Image Enlargement Ratio Used in the SR (Super position) processing Depending on the image enlargement ratio used in the SR (super position) processing carried out by the up-sampling section, in some cases, an alias may not be eliminated. In such cases, the blending coefficient λ to be used as the weight assigned to the NR (noise reduction) processing-result image is set at a large value. By setting the blending coefficient λ at a large value, it is possible to remove an alias which may not be eliminated by carrying out the SR (super resolution) processing.

(c): Adjusting the Blending Coefficient on the Basis of the Variance of Pixel Values for Each Area Unit The variance of pixel values of the processed image is found for every area determined in advance. A small variance computed for an area indicates that the area is a plain area for which the blending coefficient λ to be used as the weight assigned to the NR (noise reduction) processing-result image is set at a large value.

On the other hand, a large variance computed for an area indicates that the area is an edge or texture area for which the blending coefficient λ to be used as the weight assigned to the NR (noise reduction) processing-result image is set at a small value. That is to say, the expression (1−λ) to be used as the weight assigned to the SR (super resolution) processing-result image is set at a large value.

With the blending coefficient λ set as described above, it thus is possible to generate a blended image by for example blending the NR processing-result image obtained as a result of the NR processing with the SR processing-result image obtained as a result of the SR processing.

That is to say, the output-image generation section 220 employed in the image processing apparatus 200 explained earlier by referring to FIG. 7 and the output-image generation section 540 employed in the image processing apparatus 500 explained earlier by referring to FIG. 11 can each be configured to carry out processing to adjust the blending coefficient λ to be used as the weight assigned to the NR (noise reduction) processing-result image and the expression (1−λ) to be used as the weight assigned to the SR (super resolution) processing-result image in accordance with any of the following quantities:

(a): the ISO sensitivity computed for each area unit of the input image;

(b): the image enlargement ratio used in the SR (super position) processing as a ratio relative to the input image; and (c): the variance of pixel values for each area unit In brief, it is possible to provide a configuration in which the blending coefficient λ and the expression (1−λ) are determined in accordance with at least one of quantities (a) to (c) listed above. For example, it is possible to provide a typical configuration in which a control section employed in the image processing apparatus computes the values of the quantities (a) to (c) listed above. Then, the blending coefficient λ and the expression (1−λ) are set by applying an algorithm determined in advance to the computed values of the quantities (a) to (c). Finally, the blending coefficient λ and the expression (1−λ) are supplied to a computing section of the output-image generation section. It is to be noted that this typical configuration is shown in neither FIG. 7 nor FIG. 11.

3: Typical Hardware Configuration of the Image Processing Apparatus

Figure 12:
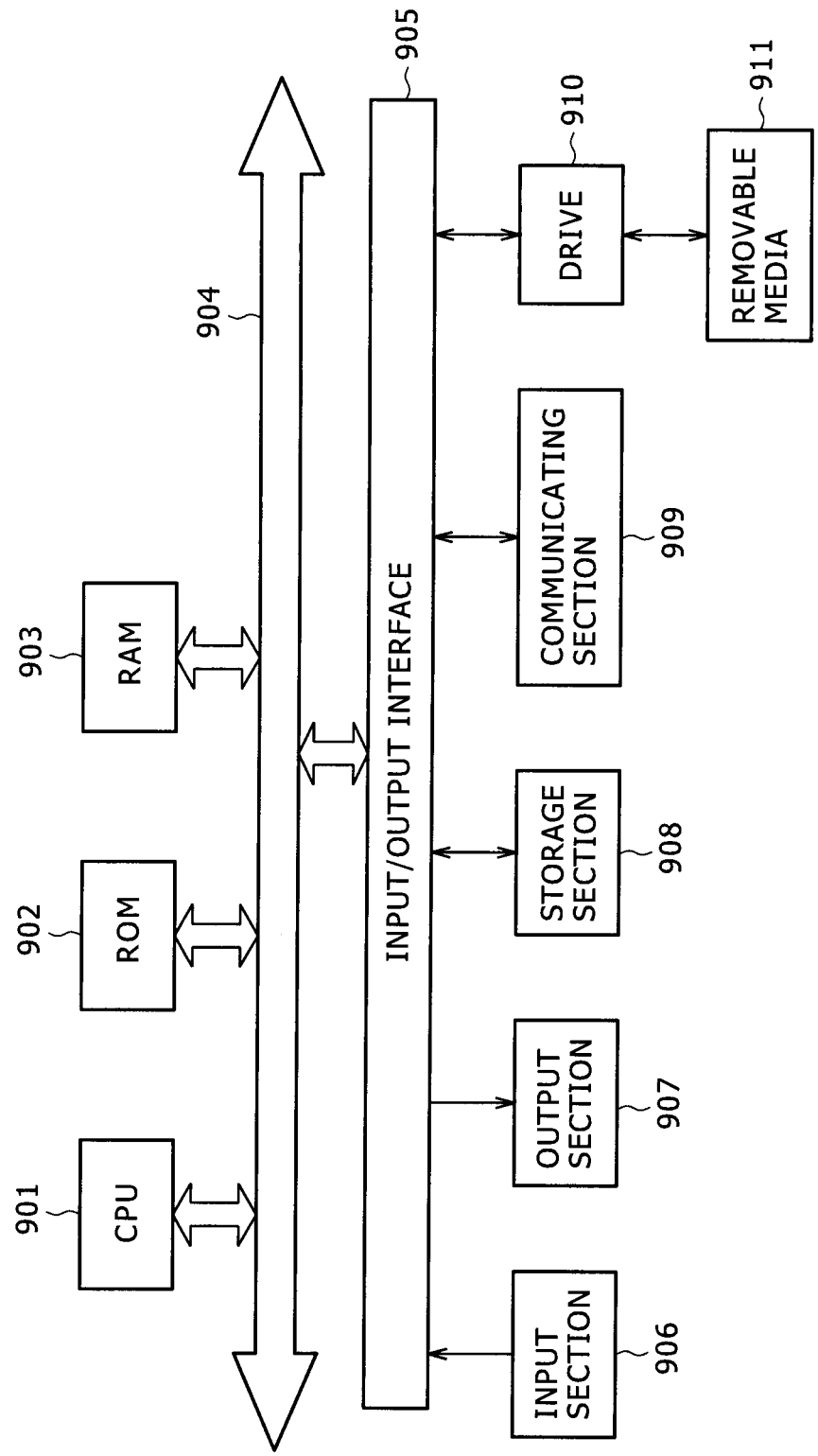
FIG. 12 is an explanatory block diagram showing a typical hardware configuration of an image processing apparatus according to an embodiment of the present invention.

Finally, a typical hardware configuration of the image processing apparatus for carrying out the processing described so far is explained by referring to FIG. 12. In the typical hardware configuration, a CPU (Central Processing Unit) 901 carries out various kinds of processing by execution of programs stored in advance in a ROM (Read Only Memory) 902 or programs loaded into a RAM (Random Access Memory) 903 from a storage section 908. The processing carried out by the CPU 901 is image processing including the super-resolution processing and the noise reduction processing which have been described earlier in the explanation of the first and second embodiments. In addition to the programs to be executed by the CPU 901, the RAM 903 is also used for properly storing data used during the processing carried out by the CPU 901. The CPU 901, the ROM 902 and the RAM 903 are connected to each other by a bus 904, which is also connected to an input/output interface 905.

The input/output interface 905 is also connected to an input section 906, an output section 907, the storage section 908 cited above and a communication section 909. The input section 906 includes a keyboard, a mouse and a microphone whereas the output section 907 includes a display unit and a speaker. The CPU 901 carries out various kinds of processing according to a command entered by the user to the input section 906 and outputs results of processing to typically the output section 907.

The storage section 908 connected to the input/output interface 905 typically includes a hard disk used for storing programs to be executed by the CPU 901 and various kinds of data. The communication section 909 is a unit for carrying out communication processing with other apparatus through a network such as the Internet and a LAN (local area network).

The input/output interface 905 is also connected to a drive 910 for driving a removable recording medium 911 in order to acquire programs and data from the removable recording medium 911 and, if necessary, transfer the programs and data to the storage section 908. The removable recording medium 911 is typically a magnetic disk, an optical disk, a magneto-optical disk or a semiconductor memory.

The present invention has been exemplified above in detail by taking the preferred first and second embodiments as examples. It is obvious, however, that those skilled in the art are capable of modifying the embodiments and replacing portions of the embodiments within a range not deviating from essentials of the present invention. That is to say, even though the present invention has been exemplified by making use of the first and second embodiments as examples, the embodiments are not to be interpreted as limitations imposed on the present invention. In order to determine the essentials of the present invention, claims appended to this specification of the present invention should be referred to.

In addition, the series of processes described previously in this specification of the present invention can be carried out by hardware and/or execution of software. If the series of processes described above is carried out by execution of software, programs composing the software can be installed into the memory employed in a computer embedded in dedicated hardware, a general-purpose computer or the like from typically a network or the removable recording medium 911 to be executed by the CPU 901. In this case, the computer or the general-purpose computer has the hardware configuration like the one shown in FIG. 12 and serves as the image processing apparatus described above whereas the memory of the computer is used as the storage section 908. A general-purpose computer is a personal computer, which can be made capable of carrying out a variety of functions by installing a variety of programs into the personal computer. Thus, if the programs are to be installed from the removable recording medium 911, the programs can be stored in the removable recording medium 911 in advance. Instead of installing the programs from the removable recording medium 911, the programs can also be installed from a network such as the Internet of a LAN (local area network) as described above. Programs read out from the removable recording medium 911 or downloaded from the network are installed in the storage section 908.

The reader is advised to keep in mind that it is a matter of course that steps prescribing a program recorded on the removable recording medium 111 are executed sequentially along the time axis in order to carry out processing described in this specification of the present invention. It is also to be noted, however, that the processing described in this specification of the present invention is not necessarily processing to be carried out by execution of the steps of a program sequentially along the time axis. That is to say, processing described in this specification of the present invention may also be processing to be carried out by execution of the steps concurrently or individually on an as-needed basis. In addition, it is also to be noted that the technical term 'system' used in this specification of the present invention implies the configuration of a logical confluence including a plurality of apparatus which are not necessarily put in the same cabinet.

As described above, in accordance with the configurations of the first and second embodiments of the present invention, it is possible to implement an image processing apparatus for carrying out the super-resolution processing as well as the noise reduction processing and implement an image processing method to be adopted by the apparatus. That is to say, in the configuration of the image processing apparatus for receiving an input image having a low resolution referred to as a first resolution and for carrying out the super-resolution processing to raise the resolution of the image, the noise reduction processing is also performed as well. To put it concretely, the image processing apparatus carries out up-sampling processing to increase the number of pixels composing the input image to the number of pixels composing an image having a high resolution referred to as a second resolution in order to generate an up-sampled image. Then, by making use of information on differences between the up-sampled image and a referenced image having the high resolution, the image processing apparatus carries out motion compensation processing of setting the photographing object in the referenced image at the same position as the photographing object in the up-sampled image in order to generate a motion-compensated image. Finally, the image processing apparatus carries out typically an integration filtering process and calculations on the motion-compensated image and the up-sampled image or on a blended image, which is obtained by blending the motion-compensated image with the up-sampled image, and the up-sampled image in order to generate an output image. The output image is equivalent to a blended image obtained by blending an image obtained as a result of the super-resolution processing with an image obtained as a result of the noise reduction processing. Thus, in the configuration of the image processing apparatus, it is possible to generate an output image by carrying various kinds of image processing equivalent to the super-resolution processing and the noise reduction processing.

The present application contains subject matter related to that disclosed in Japanese Priority Patent Application JP 2010-108407 filed in the Japan Patent Office on May 10, 2010, the entire content of which is hereby incorporated by reference.

What is claimed is:

1. An image processing apparatus to process an input image, the input image having a first resolution and including a plurality of sub-areas, the apparatus comprising:
   an up-sampling section configured to carry out up-sampling processing to increase the number of pixels composing the input image, to generate an up-sampled image having a second resolution higher than said first resolution;
   a motion-compensated image generation section configured to perform correction processing to adjust a photographing-object position on said up-sampled image based on a difference between said up-sampled image and a reference image having said second resolution, to generate a motion-compensated image;
   a blending processing section configured to blend said up-sampled image with said motion-compensated image based on a blending coefficient, to generate an intermediate blended image, wherein the blending processing section compares said up-sampled image with said motion-compensated image for each of the image sub-areas and sets the blending coefficient based on the comparison; and an output-image generation section configured to receive and process said intermediate blended image and said up-sampled image to generate an output blended image, wherein the output blended image is equivalent to an image obtained by blending a super-resolution processing-result image obtained as a result of super-resolution processing carried out to increase the resolution of said input image with a noise-reduction processing-result image obtained as a result of noise reduction processing carried out to reduce noises of said input image.

2. An image processing apparatus to process an input image, the input image having a first resolution and including a plurality of sub-areas, the apparatus comprising:

an up-sampling section configured to carry out up-sampling processing to increase the number of pixels composing the input image, to generate an up-sampled image having a second resolution higher than said first resolution;

a motion-compensated image generation section configured to perform correction processing to adjust a photographing-object position on said up-sampled image based on a difference between said up-sampled image and a reference image having said second resolution, to generate a motion-compensated image; and an output-image generation section configured to receive and process said motion-compensated image and said up-sampled image to generate an output blended image, wherein the output blended image is equivalent to an image obtained by blending a super-resolution processing-result image obtained as a result of super-resolution processing carried out to increase the resolution of said input image with a noise-reduction processing-result image obtained as a result of noise reduction processing carried out to reduce noises of said input image.

3. The image processing apparatus according to claim 1 wherein said output-image generation section comprises:

an integration filter configured to carry out down-sampling processing to reduce the number of pixels composing said intermediate blended image or said motion-compensated image to a pixel count corresponding to said first resolution and carry out up-sampling processing to increase the number of pixels composing said blended image or said motion-compensated image to a pixel count corresponding to said second resolution; and a calculation processing section configured to carry out calculation processing on said blended image or said motion-compensated image, an image output by said integration filter and said up-sampled image, for generating said output blended image.

4. The image processing apparatus according to claim 2 wherein said output-image generation section comprises:

an integration filter configured to carry out down-sampling processing to reduce the number of pixels composing said intermediate blended image or said motion-compensated image to a pixel count corresponding to said first resolution and carry out up-sampling processing to increase the number of pixels composing said blended image or said motion-compensated image to a pixel count corresponding to said second resolution; and a calculation processing section configured to carry out calculation processing on said blended image or said motion-compensated image, an image output by said integration filter and said up-sampled image, for generating said output blended image.

5. The image processing apparatus according to claim 3 wherein said integration filter is a poly-phase filter for convolving a value varying from phase to phase.

6. The image processing apparatus according to claim 4 wherein said integration filter is a poly-phase filter for convolving a value varying from phase to phase.

7. The image processing apparatus according to claim 3 wherein said output-image generation section is configured to set a blending ratio of said super-resolution processing-result image and said noise-reduction processing-result image in accordance with a parameter supplied to said calculation processing section.

8. The image processing apparatus according to claim 4 wherein said output-image generation section is configured to set a blending ratio of said super-resolution processing-result image and said noise-reduction processing-result image in accordance with a parameter supplied to said calculation processing section.

9. The image processing apparatus according to claim 7 wherein said output-image generation section carries out processing to adjust said blending ratio of said super-resolution processing-result image and said noise-reduction processing-result image in accordance with an ISO sensitivity computed for each of the image sub-areas of said input image.

10. The image processing apparatus according to claim 7 wherein said output-image generation section carries out processing to adjust said blending ratio of said super-resolution processing-result image and said noise-reduction processing-result image in accordance with an image magnification factor adopted by said up-sampling section for said input image.

11. The image processing apparatus according to claim 7 wherein said output-image generation section carries out processing to adjust said blending ratio of said super-resolution processing-result image and said noise-reduction processing-result image in accordance with a variance of pixel values for each of the image sub-areas of said input image.

12. The image processing apparatus according to claim 8 wherein said output-image generation section carries out processing to adjust said blending ratio of said super-resolution processing-result image and said noise-reduction processing-result image in accordance with an ISO sensitivity computed for each of the image sub-areas of said input image.

13. The image processing apparatus according to claim 8 wherein said output-image generation section carries out processing to adjust said blending ratio of said super-resolution processing-result image and said noise-reduction processing-result image in accordance with an image magnification factor adopted by said up-sampling section for said input image.

14. The image processing apparatus according to claim 8 wherein said output-image generation section carries out processing to adjust said blending ratio of said super-resolution processing-result image and said noise-reduction processing-result image in accordance with a variance of pixel values for each of the image sub-areas of said input image.

15. An image processing method for an image processing apparatus to process an input image, said apparatus including an up-sampling section, a motion-compensated image generation section, a blending processing section and an output-image generation section, said input image having a first resolution and including a plurality of sub-areas, said image processing method comprising:

performing, by said up-sampling section, up-sampling processing to increase the number of pixels composing the input image, to generate an up-sampled image having a second resolution higher than said first resolution;

performing, by said motion-compensated image generation section, correction processing to adjust a photographing-object position on said up-sampled image based on a difference between said up-sampled image and a reference image having said second resolution, to generate a motion-compensated image;

blending, by said blending processing section, said up-sampled image with said motion-compensated image based on a blending coefficient, to generate an intermediate blended image, wherein the blending processing section compares said up-sampled image with said motion-compensated image for each of the image sub-areas and sets the blending coefficient based on the comparison; and receiving and processing, by said output-image generation section, said intermediate blended image and said up-sampled image to generate an output blended image, wherein the output blended image is equivalent to an image obtained by blending a super-resolution processing-result image obtained as a result of super-resolution processing carried out to increase the resolution of said input image with a noise-reduction processing-result image obtained as a result of noise reduction processing carried out to reduce noises of said input image.

16. An image processing method for an image processing apparatus to process an input image, said apparatus including an up-sampling section, a motion-compensated image generation section and an output-image generation section, said input image having a first resolution and including a plurality of sub-areas, said image processing method comprising:

performing, by said up-sampling section, up-sampling processing to increase the number of pixels composing the input image, to generate an up-sampled image having a second resolution higher than said first resolution;

performing, by said motion-compensated image generation section, correction processing to adjust a photographing-object position on said up-sampled image based on a difference between said up-sampled image and a reference image having said second resolution, to generate a motion-compensated image; and receiving and processing, by said output-image generation section, said motion-compensated image and said up-sampled image to generate an output blended image, wherein the output blended image is equivalent to an image obtained by blending a super-resolution processing-result image obtained as a result of super-resolution processing carried out to increase the resolution of said input image with a noise-reduction processing-result image obtained as a result of noise reduction processing carried out to reduce noises of said input image.

17. A non-transitory computer-readable medium including instructions, executable by a processor, to cause an image processing apparatus to perform an image processing method on an input image, said apparatus including an up-sampling section, a motion-compensated image generation section, a blending processing section and an output-image generation section, said input image having a first resolution and including a plurality of sub-areas, said image processing method comprising:

performing, by said up-sampling section, up-sampling processing to increase the number of pixels composing the input image, to generate an up-sampled image having a second resolution higher than said first resolution;

performing, by said motion-compensated image generation section, correction processing to adjust a photographing-object position on said up-sampled image based on a difference between said up-sampled image and a reference image having said second resolution, to generate a motion-compensated image;

blending, by said blending processing section, said up-sampled image with said motion-compensated image based on a blending coefficient, to generate an intermediate blended image, wherein the blending processing section compares said up-sampled image with said motion-compensated image for each of the image sub-areas and sets the blending coefficient based on the comparison; and receiving and processing, by said output-image generation section, said intermediate blended image and said up-sampled image to generate an output blended image, wherein the output blended image is equivalent to an image obtained by blending a super-resolution processing-result image obtained as a result of super-resolution processing carried out to increase the resolution of said input image with a noise-reduction processing-result image obtained as a result of noise reduction processing carried out to reduce noises of said input image.

18. A non-transitory computer-readable medium including instructions, executable by a processor, to cause an image processing apparatus to perform an image processing method on an input image, said apparatus including an up-sampling section, a motion-compensated image generation section and an output-image generation section, said input image having a first resolution and including a plurality of sub-areas, said image processing method comprising:

performing, by said up-sampling section, up-sampling processing to increase the number of pixels composing the input image, to generate an up-sampled image having a second resolution higher than said first resolution;

performing, by said motion-compensated image generation section, correction processing to adjust a photographing-object position on said up-sampled image based on a difference between said up-sampled image and a reference image having said second resolution, to generate a motion-compensated image; and receiving and processing, by said output-image generation section, said motion-compensated image and said up-sampled image to generate an output blended image, wherein the output blended image is equivalent to an image obtained by blending a super-resolution processing-result image obtained as a result of super-resolution processing carried out to increase the resolution of said input image with a noise-reduction processing-result image obtained as a result of noise reduction processing carried out to reduce noises of said input image.

* * * * *